(12) United States Patent
Chun et al.

(10) Patent No.: US 10,073,668 B2
(45) Date of Patent: Sep. 11, 2018

(54) METHOD FOR MEASURING ANGLES BETWEEN DISPLAYS AND ELECTRONIC DEVICE USING THE SAME

(71) Applicant: Samsung Electronics Co., Ltd., Gyeonggi-do (KR)

(72) Inventors: Woosung Chun, Gyeonggi-do (KR); Soohyeon Sim, Incheon (KR); Seulki Lee, Gyeonggi-do (KR); Kyungjung Kim, Gyeonggi-do (KR); Seongeun Kim, Gyeonggi-do (KR); Jinwoo Kim, Seoul (KR); Jungsik Park, Gyeonggi-do (KR); Jingil Yang, Gyeonggi-do (KR); Yujeong Jeon, Gyeonggi-do (KR); Inji Jin, Gyeonggi-do (KR); Hyunju Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 16 days.

(21) Appl. No.: 15/262,917

(22) Filed: Sep. 12, 2016

(65) Prior Publication Data

US 2017/0075640 A1 Mar. 16, 2017

(30) Foreign Application Priority Data

Sep. 11, 2015 (KR) .................. 10-2015-0129196

(51) Int. Cl.
*G06F 3/14* (2006.01)
*G06F 1/16* (2006.01)
(Continued)

(52) U.S. Cl.
CPC .......... *G06F 3/1446* (2013.01); *G06F 1/1618* (2013.01); *G06F 1/1647* (2013.01);
(Continued)

(58) Field of Classification Search
None
See application file for complete search history.

(56) References Cited

U.S. PATENT DOCUMENTS

| 2002/0103610 A1 | 8/2002 | Bachmann et al. |
| 2004/0145653 A1 | 7/2004 | Choi |

(Continued)

OTHER PUBLICATIONS

International Search Report dated Dec. 19, 2016 issued in counterpart application No. PCT/KR2016/010211, 3 pages.
(Continued)

*Primary Examiner* — Vu Nguyen
(74) *Attorney, Agent, or Firm* — The Farrell Law Firm, P.C.

(57) ABSTRACT

An electronic device is provided. The electronic device includes a foldable housing including a first housing part that includes a first surface and a second surface facing opposite to the first surface, a second housing part including a first surface that faces the first surface of the first housing part when the housing is folded in a first direction and a second surface that faces the second surface of the first housing part when the housing is folded in a second direction. The electronic device includes a first display, a second display disposed, a first sensor disposed in the first housing part, a second sensor disposed in the second housing part, and a processor that is configured to identify an angle between the first housing part and the second housing part using the first sensor and the second sensor and execute at least one action of the electronic device based on the identified angle.

20 Claims, 30 Drawing Sheets

(51) Int. Cl.
    *G09G 3/20* (2006.01)
    *G09G 3/00* (2006.01)
(52) U.S. Cl.
    CPC .......... *G06F 1/1677* (2013.01); *G06F 3/1423*
        (2013.01); *G09G 3/003* (2013.01); *G09G
        3/2092* (2013.01); *G09G 2320/068* (2013.01);
        *G09G 2340/045* (2013.01); *G09G 2340/0492*
        (2013.01); *G09G 2354/00* (2013.01); *G09G
        2356/00* (2013.01)

(56) References Cited

U.S. PATENT DOCUMENTS

| | | | |
|---|---|---|---|
| 2013/0205142 A1 | 8/2013 | Jung | |
| 2013/0325386 A1 | 12/2013 | Taken | |
| 2014/0306908 A1* | 10/2014 | Nagaraju | G06F 3/0416 345/173 |
| 2015/0009190 A1 | 1/2015 | Kuwahara | |
| 2015/0116362 A1 | 4/2015 | Aurongzeb et al. | |
| 2016/0050408 A1* | 2/2016 | Lee | H04N 13/0282 348/47 |

OTHER PUBLICATIONS

European Search Report dated May 16, 2018 issued in counterpart application No. 16844752.2-1210, 13 pages.

\* cited by examiner

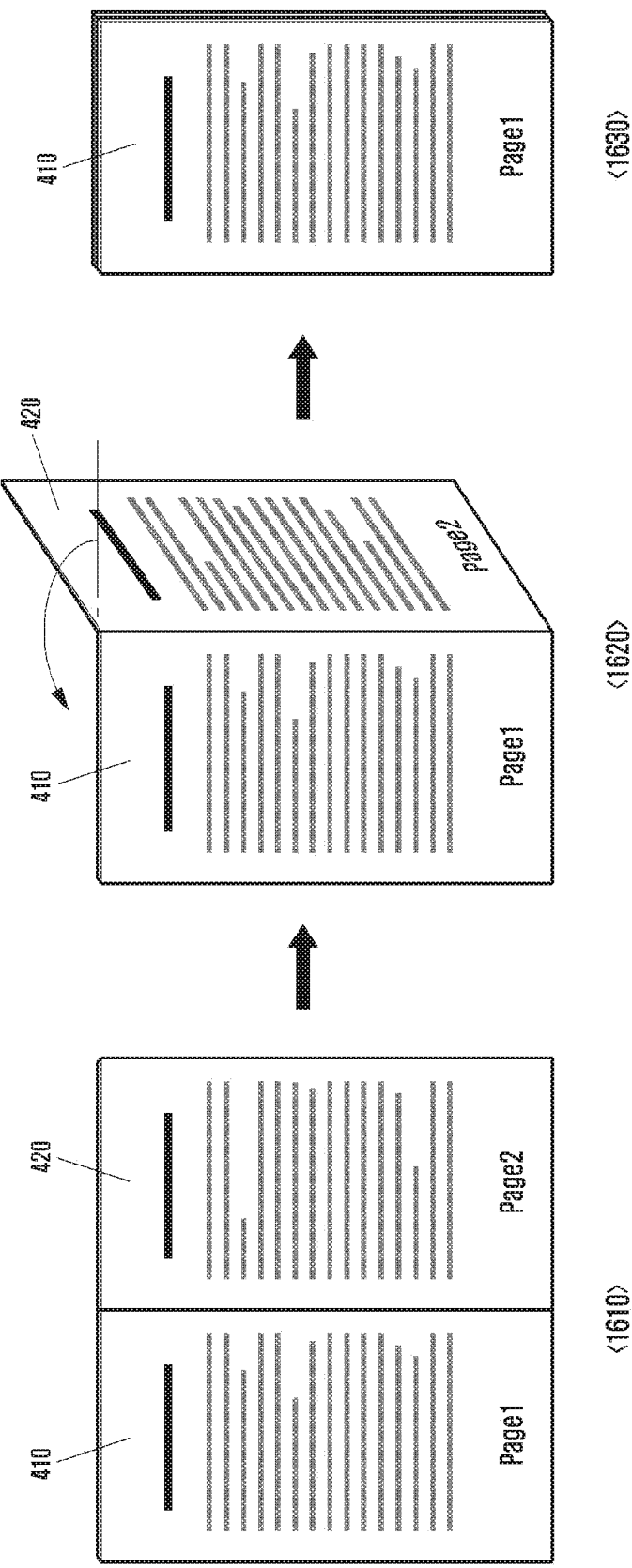

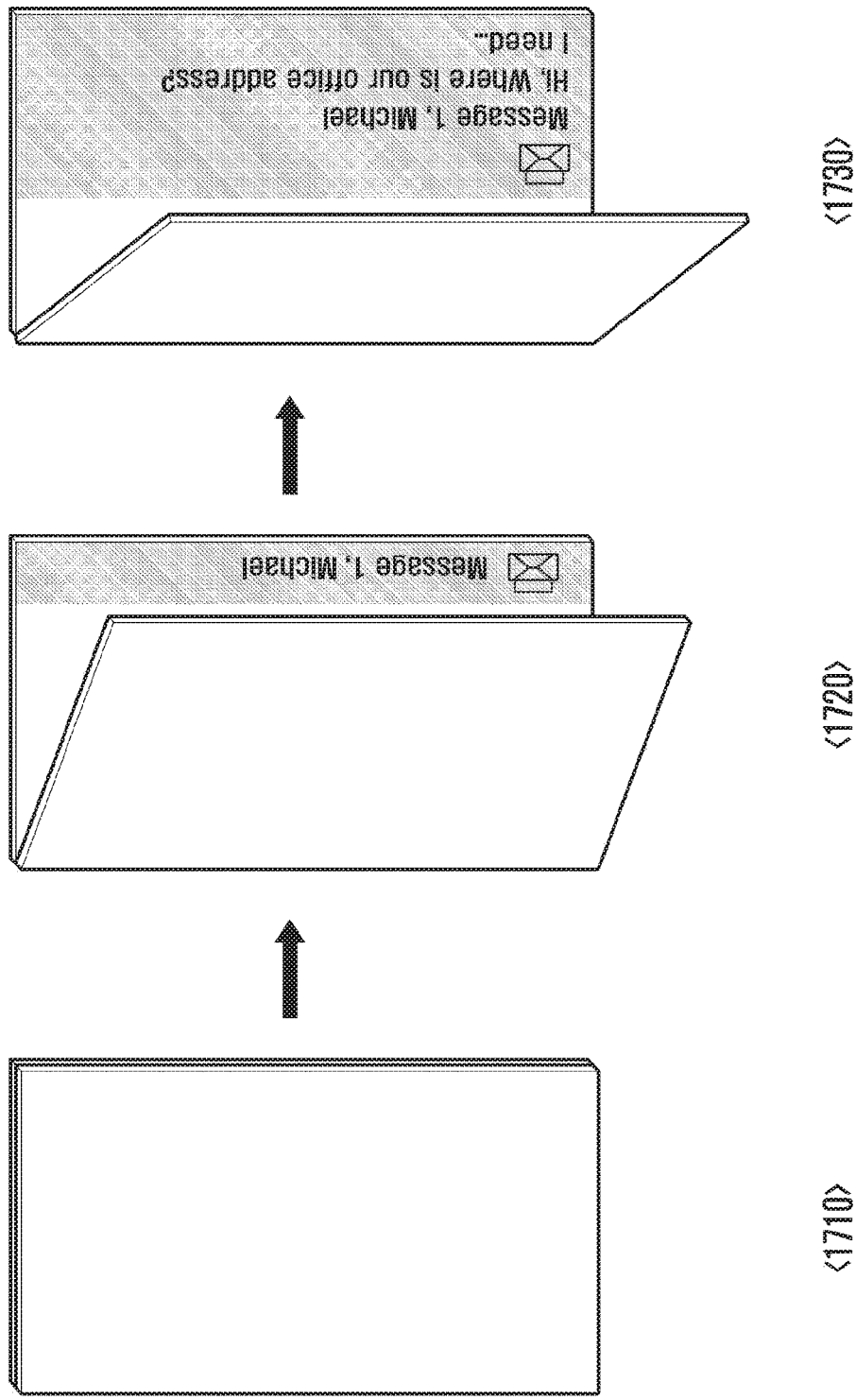

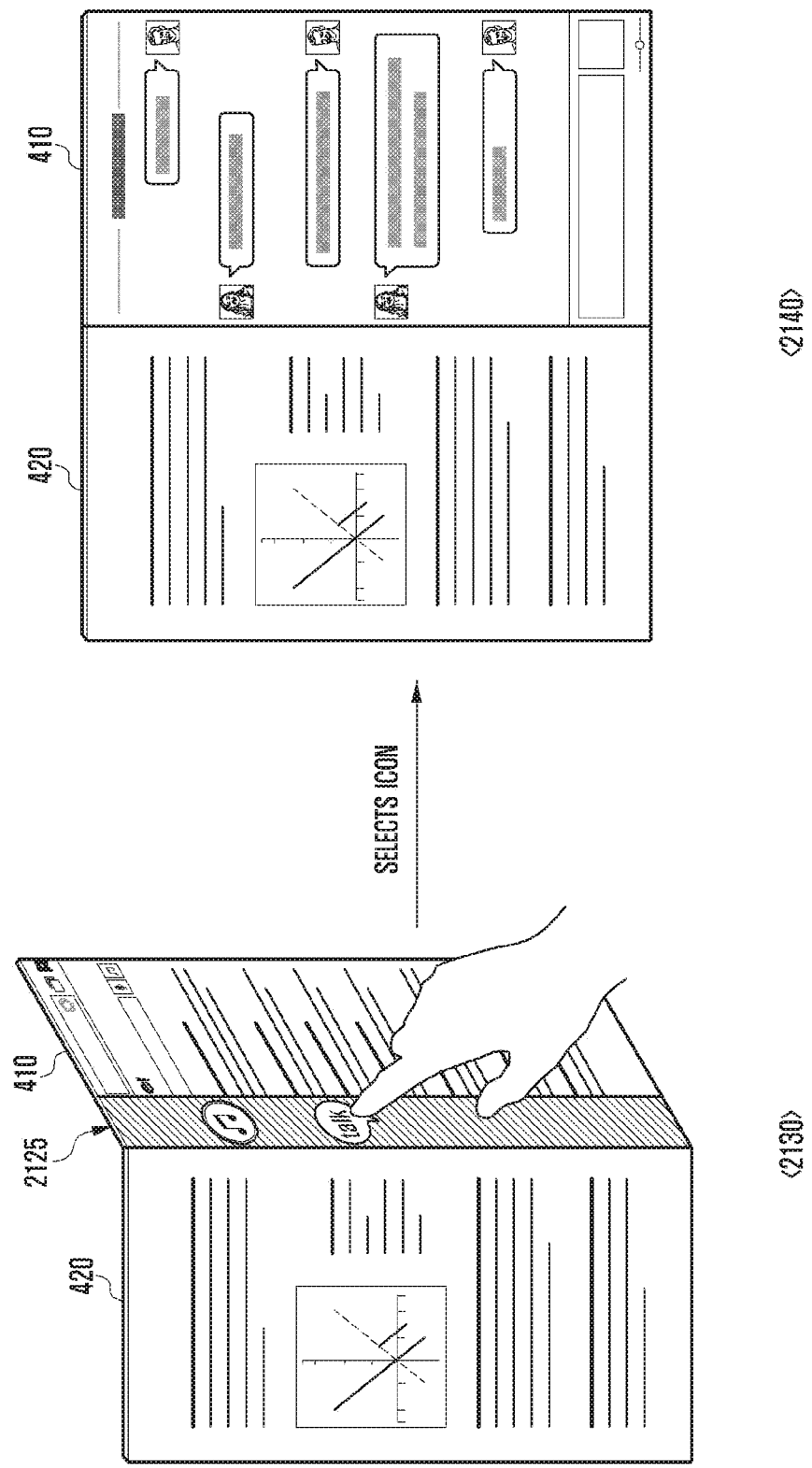

US 10,073,668 B2

METHOD FOR MEASURING ANGLES BETWEEN DISPLAYS AND ELECTRONIC DEVICE USING THE SAME

PRIORITY

The present application claims priority under 35 U.S.C. § 119(a) to Korean Patent Application Serial No. 10-2015-0129196, which was filed on Sep. 11, 2015 in the Korean Intellectual Property Office, the entire disclosure of which is incorporated herein by reference.

BACKGROUND

1. Field of the Disclosure

The present disclosure relates generally to an electronic device including multiple displays, and more particularly, to a method for measuring an angle between the multiple displays of the electronic device.

2. Description of the Related Art

Conventional electronic devices can output at least two screens, which can be configured to output to two physically divided displays of the electronic device. In certain circumstances, the electronic device can include a single display that can be configured to output the two screens.

SUMMARY

An aspect of the present disclosure provides an electronic device that is configured to measure an angle between displays of the electronic device which outputs at least two screens. For example, the angle between the displays can be measured by installing a sensor in a plurality of displays. Further, various functions can be provided for a user by utilizing the measured angle.

In accordance with an aspect of the present disclosure, there is provided an electronic device. The electronic device includes a foldable housing including a first housing part that includes a first surface and a second surface facing opposite to the first surface, a second housing part including a first surface that faces the first surface of the first housing part when the housing is folded in a first direction and a second surface that faces the second surface of the first housing part when the housing is folded in a second direction, and a connector configured to connect the first housing part to the second housing part. The electronic device also includes a first display disposed on the first surface of the first hosing part, a second display disposed on the second surface of the second housing part, a first sensor disposed in the first housing part, a second sensor disposed in the second housing part, and a processor that is configured to identify an angle between the first housing part and the second housing part using the first sensor and the second sensor and execute at least one action of the electronic device based on the identified angle.

In accordance with an aspect of the present disclosure, there is provided an electronic device. The electronic device includes a foldable housing including a first housing part that includes a first surface and a second surface facing opposite to the first surface, a second housing part that includes a first surface that faces the first surface of the first housing part when the housing is folded in a first direction and a second surface that faces the second surface of the first housing part when the housing is folded in a second direction, and a connector configured to connect the first housing part to the second housing part. The electronic device also includes a first display disposed in the first surface of the first hosing part, a second display disposed in the second surface of the second housing part, a sensor disposed in the first housing part, and a processor that is configured to identify an angle between the first housing part and the second housing part using the sensor and execute at least one action of the electronic device based on the identified angle.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIGS. 16A to 16C are screenshots of a method for displaying an electronic book by using an angle between displays, according to an embodiment of the present disclosure;

FIGS. 17A and 17B are screenshots of a method for displaying different information in displays corresponding to an unfolding angle between the displays, according to an embodiment of the present disclosure;

FIGS. 21A and 21B are screenshots of a method for providing an application control interface by using an angle between displays, according to an embodiment of the present disclosure.

DETAILED DESCRIPTION

Figure 1:
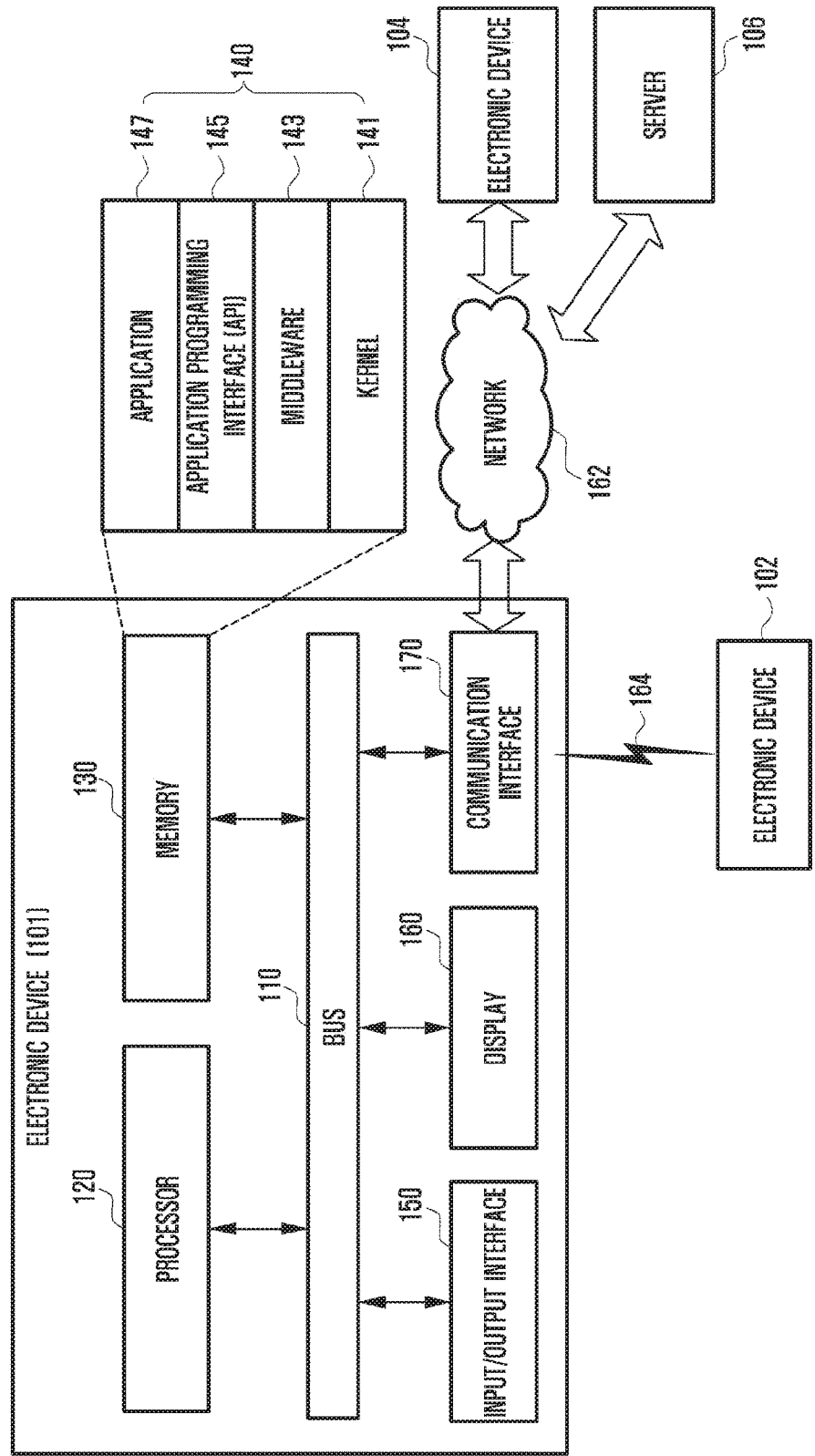
FIG. 1 is a diagram of a network environment including an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," "may include," "comprise," and "may comprise" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even terms defined in this disclosure should not be interpreted as excluding the embodiments of the present disclosure.

An electronic device in accordance with the present disclosure may be a device that is configured to perform a communication function. For example, the electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a portable medical device, a digital camera, or a wearable device (e.g., a head-mounted device (HMD) such as electronic glasses, electronic clothes, an electronic bracelet, an electronic necklace, an electronic appcessory, or a smart watch).

The electronic device may be a smart home appliance that is configured to perform a communication function. For example, the electronic device may be a TV, a digital video disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

The electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), an flight data recorder (FDR), a car infotainment device, electronic equipment for ship (e.g., a marine navigation system, a gyrocompass, etc.), avionics, security equipment, or an industrial or home robot.

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

FIG. 1 is a diagram of an electronic apparatus, according to an embodiment of the present disclosure.

Referring to FIG. 1, the electronic device 101 includes a bus 110, a processor 120, a memory 130, a user input/output module 150, a display 160, and a communication interface 170.

The bus 110 may be a circuit for interconnecting elements described above and for allowing a communication, e.g. by transferring a control message, between the elements described above.

The processor 120 can receive commands from the above-mentioned other elements, e.g. the memory 130, the user input/output module 150, the display 160, and the communication interface 170, through, for example, the bus 110, can decipher the received commands, and can perform operations and/or data processing according to the deciphered commands.

The memory 130 can store commands received from the processor 120 and/or other elements, e.g. the user input/output module 150, the display 160, and the communication interface 170, and/or commands and/or data generated by the processor 120 and/or other elements. The memory 130 may include software and/or programs 140, such as a kernel 141, middleware 143, an application programming interface (API) 145, and an application 147. Each of the programming modules described above may be configured using software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and control and/or manage an individual element of the electronic device 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic device 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The user input/output module 150 can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic device 100 and electronic devices 102 and 104 and/or a server 164. The communication interface 170 can support short range communication protocols, e.g. a wireless fidelity (WiFi) protocol, a bluetooth (BT) protocol, and a near field communication (NFC) protocol, communication networks, e.g. the Internet, local area network (LAN), wide area network (WAN), a telecommunication network, a cellular network, and a satellite network, or a plain old telephone service (POTS), or any other similar and/or suitable communication networks, such as a network 162, or the like. Each of the electronic devices 102 and 104 may be the same type and/or a different type of electronic device as the electronic device 101.

Figure 2:
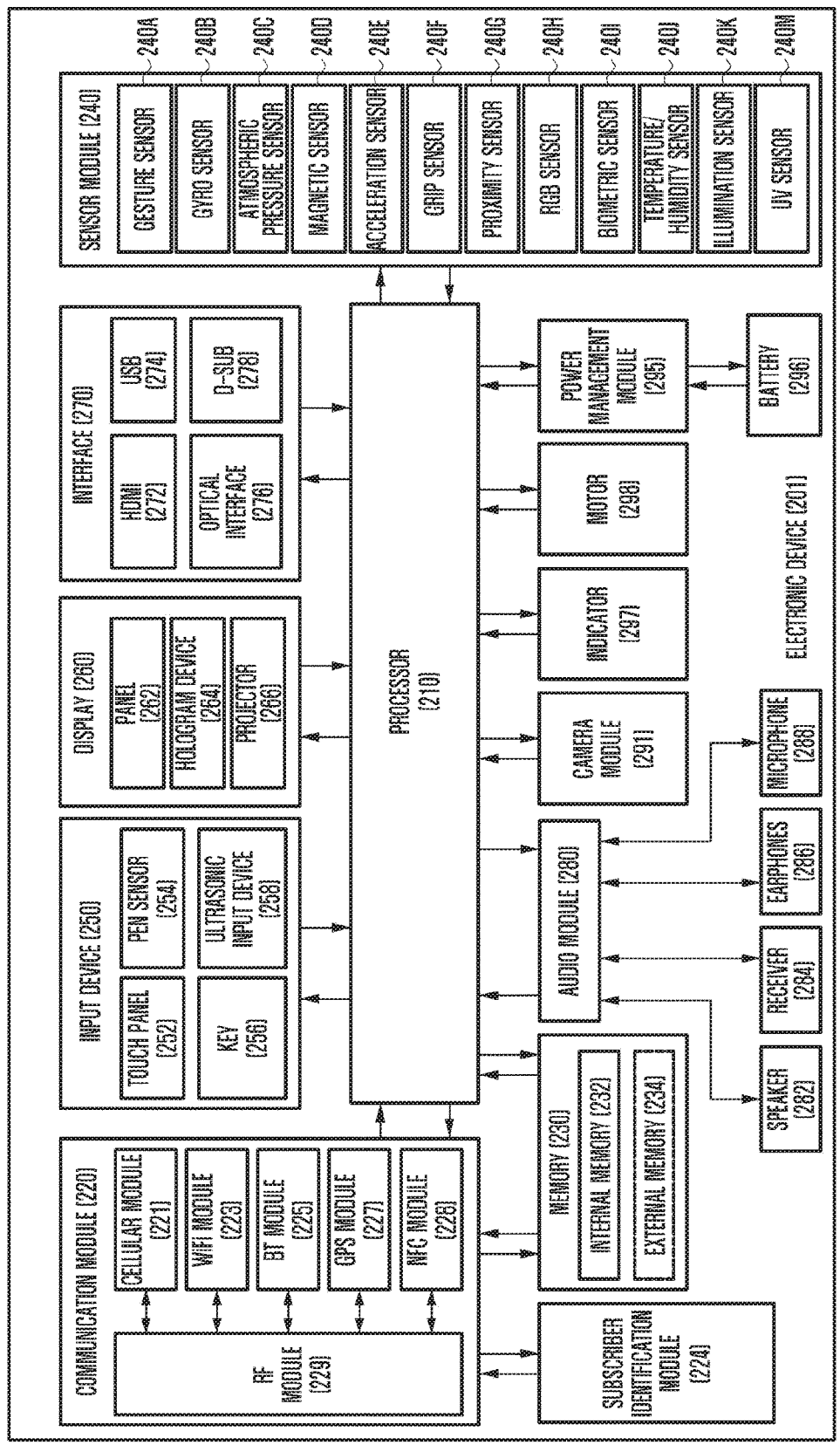
FIG. 2 is a diagram of a configuration of an electronic device, according to an embodiment of the present disclosure.

FIG. 2 is a diagram of an electronic device 201, according to an embodiment of the present disclosure. The electronic device 201 may include all or some of the components of the electronic device 101 shown in FIG. 1. Referring to FIG. 2, the electronic device 201 includes at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of a system-on-chip (SoC), for example. The AP 210 may further include a graphic processing unit (GPU).

The communication module 220 may perform a data communication with the electronic device 104 or the server 106 which can be connected to the electronic device 200 through the network 162. The communication module 220 may include therein a cellular module 221, a WiFi module 223, a BT module 225, a GPS module 227, an NFC module 228, and a radio frequency (RF) module 229.

The cellular module 221 may offer a voice call, a video call, a message service, an internet service, or the like through a communication network (e.g., long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), etc.). Additionally, the cellular module 221 may perform identification and authentication of the electronic device in the communication network, using the SIM card 224. The cellular module 221 may perform at least part of functions that the AP 210 can provide. For example, the cellular module 221 may perform at least part of a multimedia control function.

The cellular module 221 may include a communication processor (CP). Additionally, the cellular module 221 may be formed of an SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

The AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single integrated circuit (IC) chip or a single IC package. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a power amp module (PAM), a frequency filter, a low noise amplifier (LNA), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be inserted into a slot formed at a certain place of the electronic device 201. The SIM card 224 may contain therein an integrated circuit card identifier (ICCID) or an international mobile subscriber identity (IMSI).

The memory 230 (may include an internal memory 232 and an external memory 234. The internal memory 232 may include, for example, at least one of a volatile memory (e.g., dynamic random access memory (DRAM), static RAM (SRAM), synchronous DRAM (SDRAM), etc.) or a nonvolatile memory (e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory, etc.).

The internal memory 232 may have the form of an solid state drive (SSD). The external memory 234 may include a flash drive, e.g., compact flash (CF), secure digital (SD), micro secure digital (Micro-SD), mini secure digital (Mini-SD), extreme digital (xD), memory stick, or the like. The external memory 234 may be functionally connected to the electronic device 201 through various interfaces. The electronic device 201 may further include a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature-humidity sensor 240J, an illumination sensor 240K, and a ultraviolet (UV) sensor 240M. Additionally or alternatively, the sensor module 240 may include, e.g., an E-nose sensor, an electromyography (EMG) sensor, an electroencephalogram (EEG) sensor, an electrocardiogram (ECG) sensor, an infrared (IR) sensor, an iris scan sensor, or a finger scan sensor. Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. The electronic device 201 may receive a user input from any external device (e.g., a computer or a server) connected thereto through the communication module 220.

The display 260 may include a panel 262, a hologram 264, or a projector 266. The panel 262 may be, for example, liquid crystal display (LCD), active matrix organic light emitting diode (AM-OLED), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. The display 260 may further include a control circuit for controlling the panel 262, the hologram 264, and the projector 266.

The interface 270 may include, for example, a high-definition multimedia interface (HDMI) 272, a universal serial bus (USB) 274, an optical interface 276, or a d-sub-miniature (D-sub) 278. The interface 270 may be contained, for example, in the communication interface 160 shown in FIG. 1. Additionally or alternatively, the interface 270 may include, for example, a mobile high-definition link (MHL) interface, a secure digital (SD) card/multi-media card (MMC) interface, or an infrared data association (IrDA) interface.

The audio module 280 may perform a conversion between sounds and electric signals. At least part of the audio module 280 may be contained, for example, in the input/output interface 140 shown in FIG. 1. The audio module 280 may process sound information inputted or outputted through a speaker 282, a receiver 284, an earphone 286, or the microphone 288.

The camera module 291 is a device capable of obtaining still images and moving images. According to an embodiment, the camera module 291 may include at least one image sensor (e.g., a front sensor or a rear sensor), a lens, an image signal processor (ISP), or a flash (e.g., light emitting diode (LED) or xenon lamp).

The power management module 295 may manage electric power of the electronic device 201. Although not shown, the power management module 295 may include, for example, a power management integrated circuit (PMIC), a charger IC, or a battery gauge.

The PMIC may be formed, for example, of an IC chip or SoC. Charging may be performed in a wired or wireless manner. The charger IC may charge a battery 296 and prevent overvoltage or overcurrent from a charger. The charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., graphic processing unit (GPU)) for supporting a mobile TV. This processor may process media data that comply with standards of digital multimedia broadcasting (DMB), digital video broadcasting (DVB), or MediaFlo™.

Each of the above-discussed elements of the electronic device 201 disclosed herein may be formed of one or more components, and its name may be varied according to the type of the electronic device 201. The electronic device 201 disclosed herein may be formed of at least one of the above-discussed elements without some elements or with additional other elements. Some of the elements may be integrated into a single entity that still performs the same functions as those of such elements before integrated.

Figure 3:
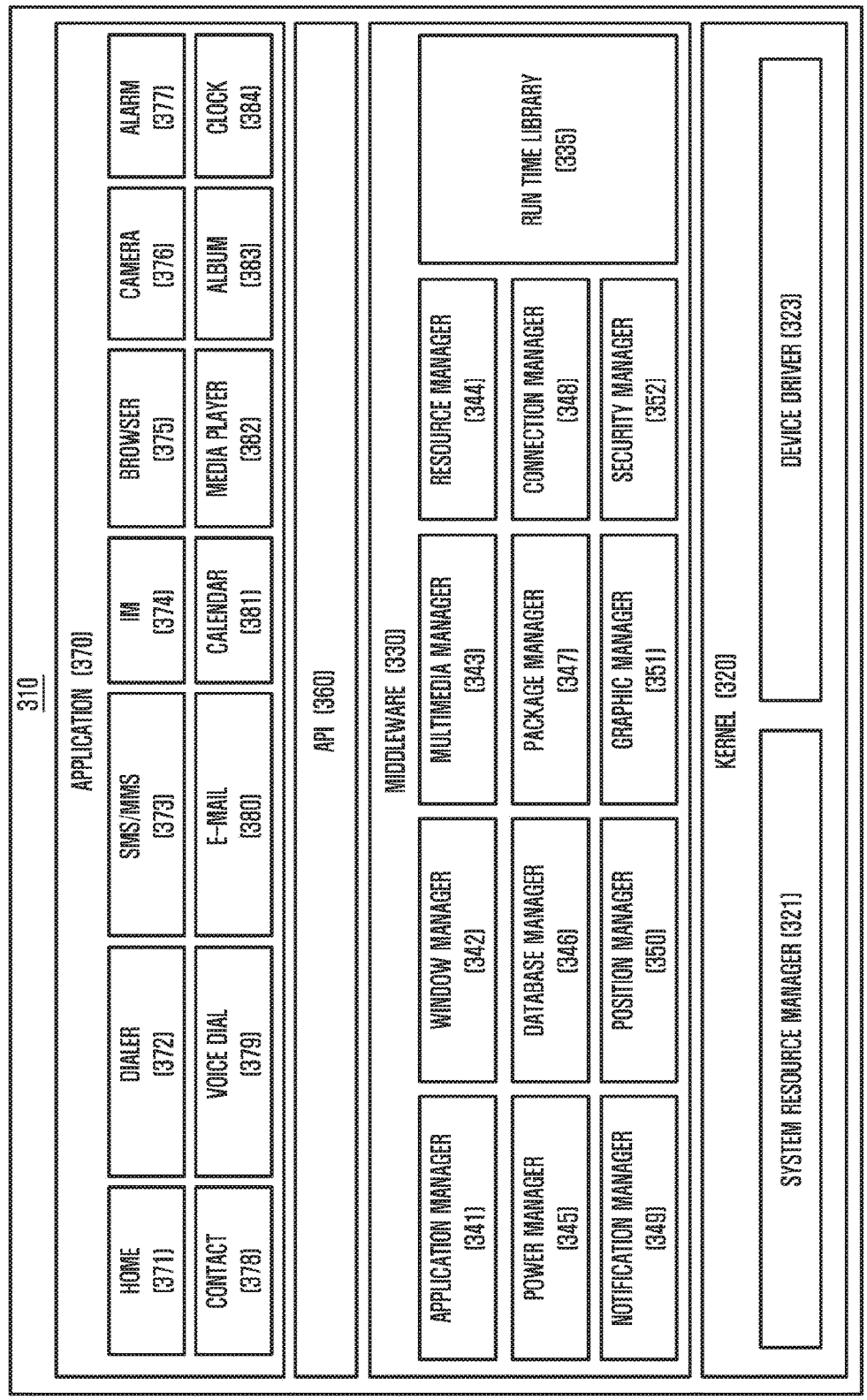
FIG. 3 is a diagram of a configuration of a program module, according to an embodiment of the present disclosure.

FIG. 3 is a diagram of a configuration of a programming module 300, according to an embodiment of the present disclosure.

The programming module 300 may be included (or stored) in the electronic device 101 or may be included (or stored) in the electronic device 201 illustrated in FIGS. 1 and 2, respectively. At least a part of the programming module 300 may be implemented in software, firmware, hardware, or a combination of two or more thereof. The programming module 300 may be implemented in hardware, and may include an OS controlling resources related to the electronic device 100 and/or various applications (e.g., an application 370) executed in the OS. For example, the OS may be Android™, iOS™, Windows™ Symbian™, Tizen™, Bada™, and the like.

Referring to FIG. 3, the programming module 310 includes a kernel 320, a middleware 330, an API 360, and/or the application 370.

The kernel 320 may include a system resource manager 321 and/or a device driver 323. The system resource manager 321 may include, for example, a process manager, a memory manager, and a file system manager. The system resource manager 321 may perform the control, allocation, recovery, and/or the like of system resources. The device driver 323 may include, for example, a display driver, a camera driver, a BT driver, a shared memory driver, a USB driver, a keypad driver, a Wi-Fi driver, and/or an audio driver. Also, the device driver 323 may include an inter-process communication (IPC) driver.

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device 101. For example, as illustrated in FIG. 3, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. The runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. When the electronic device 101 has a telephone function, the middleware 330 may further include a telephony manager for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described herein, may further include other elements, or may replace the some of the elements with elements, each of which performs a similar function and has a different name.

The API 360 is a set of API programming functions, and may be provided with a different configuration according to an OS. In the case of Android™ or iOS™, for example, one API set may be provided to each platform. In the case of Tizen™, for example, two or more API sets may be provided to each platform.

The applications 370 may include, for example, a preloaded application and/or a third party application. The applications 370 may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors, the one or more processors may perform functions corresponding to the instructions. The non-transitory computer-readable storage medium may be, for example, the memory 220. At least a part of the programming module 310 may be implemented (e.g., executed) by, for example, the one or more processors 210. At least a part of the programming module 310 may include, for example, a module, a program, a routine, a set of instructions, and/or a process for performing one or more functions.

Figure 4:
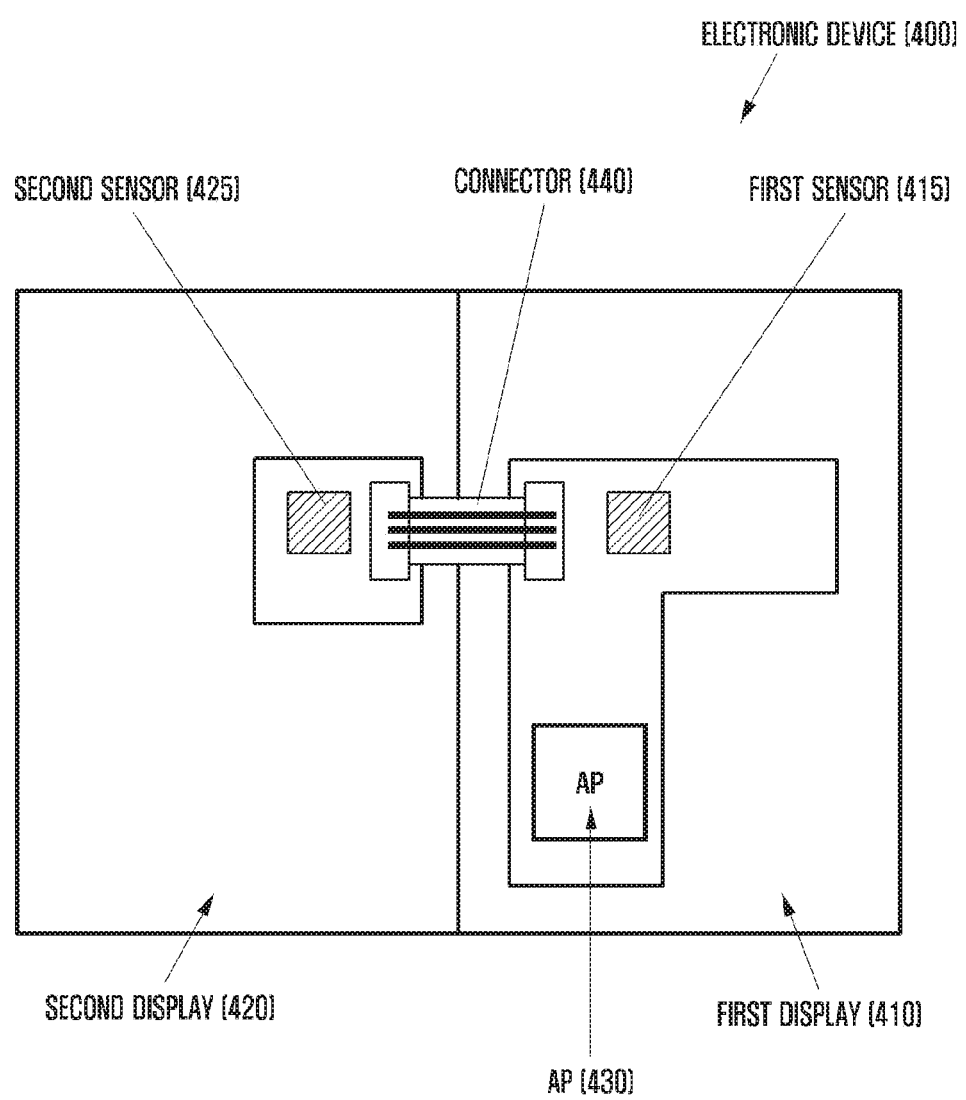
FIG. 4 is a diagram of a sensor connection structure of an electronic device, according to an embodiment of the present disclosure.

FIG. 4 is a diagram of a sensor connection structure of an electronic device 400, according to an embodiment of the present disclosure.

The electronic device 400 includes a first display 410, first sensor 415, second display 420, second sensor 425, an AP 430, and connector 440. The first display 410 and the second display 420 may be formed with physically divided displays. Further, the first display 410 and the second display 420 may be formed in a functionally divided display (for example: a flexible display).

The first sensor 415 and the second sensor 425 may be formed with a 6-axis sensor. For example, the 6-axis sensor may mean a combination of a 3-axis acceleration sensor and a 3-axis gyroscope sensor.

The first sensor 415 and the second sensor 425 may be formed with at least one of a geomagnetic sensor, hall sensor, proximity sensor, and illumination sensor besides the 6-axis sensor. The first sensor 415 and the second sensor 425 can measure an angle between the first display 410 and the second display 420 by using at least one of the geomagnetic sensor, hall sensor, proximity sensor, and illumination sensor. For example, an angle between the first display 410 and the second display 420 can be measured by detecting a magnetic material, which can be attached to the first display 410 and/or the second display 420, with a geomagnetic sensor or a hall sensor, or by detecting a distance between the first display 410 and the second display 420 with a proximity sensor or an illumination sensor.

The first sensor 415 can be installed in the first display 410 and the second sensor 425 can be installed in the second display 420.

The first sensor 415 and the second sensor 425 can be connected through the connector 440. The connector 440 may be formed with a flexible printed circuit board (FPCB), and the first display 410 and the second display 420 can be folded on each other.

The first sensor 415 and the second sensor 425 can be connected through the communication module 220, for example, and/or the connector 440. For example, the first sensor 415 and the second sensor 425 can transmit and receive a communication signal (for example, an RF signal) by using at least one of an RF module 229, cellular module 221, WiFi module 223, Bluetooth module 225, and NFC module 228.

The AP 430 can measure an angle between the first display 410 and the second display 420 by using sensor data obtained from the first sensor 415 and the second sensor 425.

Figure 5:
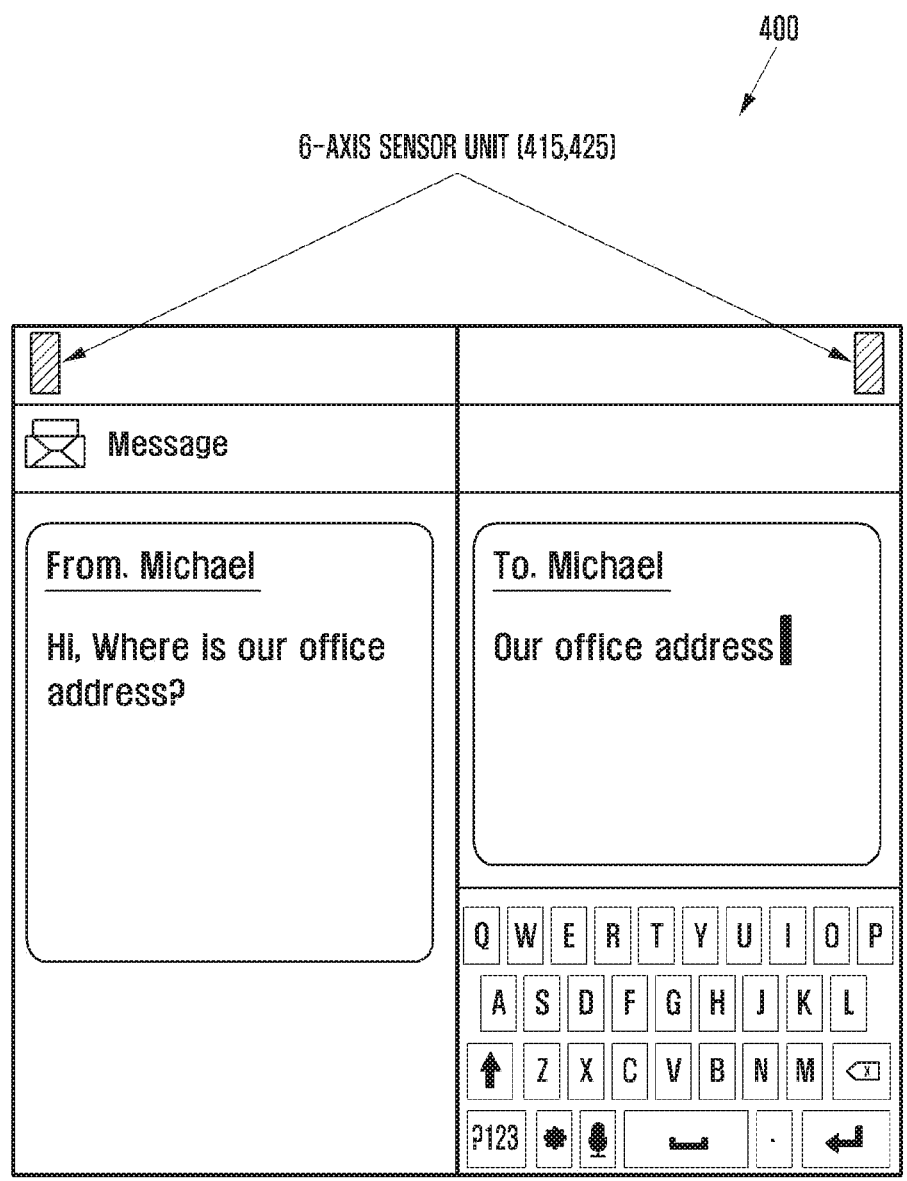
FIG. 5 is a diagram of a disposition of sensors, according to an embodiment of the present disclosure.

FIG. 5 is a diagram of a disposition of sensors, according to an embodiment of the present disclosure.

The first sensor 415 and the second sensor 425 may be configured with a 6-axis sensor and located at an edge of the first display 410 and the second display 420. Accordingly, the first sensor 415 can detect a movement of the first display 410 and the second sensor 425 can detect a movement of the second display 420.

Figure 6:
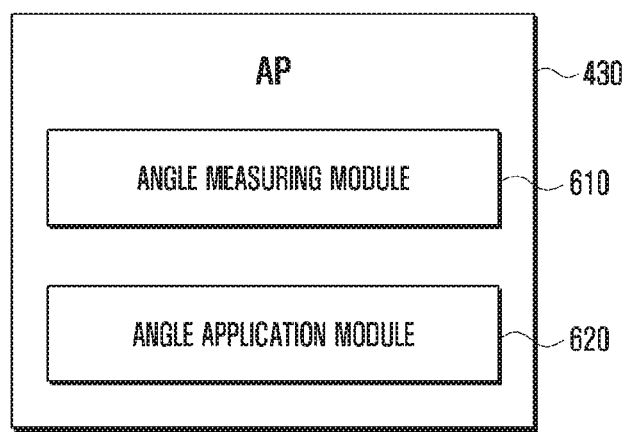
FIG. 6 is a diagram of components of an application processor (AP) for measuring and applying an angle, according to an embodiment of the present disclosure.

FIG. 6 is a diagram of the AP 430 for measuring and applying an angle, according to an embodiment of the present disclosure.

The AP 430 may include an angle measuring module 610 and an angle applying module 620. The AP 430 can measure an angle between the first display 410 and the second display 420 by using sensor data collected by the first sensor 415 and the second sensor 425. Further, the AP 430 can provide various functions of the electronic device for a user by applying the measured angle.

Figure 8:
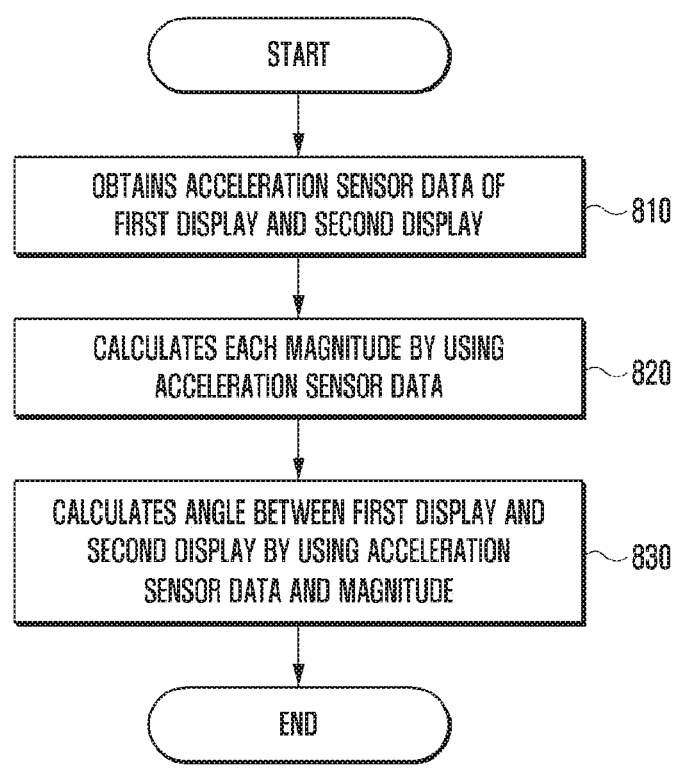
FIG. 8 is a flowchart of a method for measuring an angle between a first display and a second display by using acceleration sensor data, according to an embodiment of the present disclosure.

The angle measuring module 610 can measure an angle between the first display 410 and the second display 420 by using an acceleration sensor, a detailed description of which is made with reference to FIG. 8.

Figure 9:
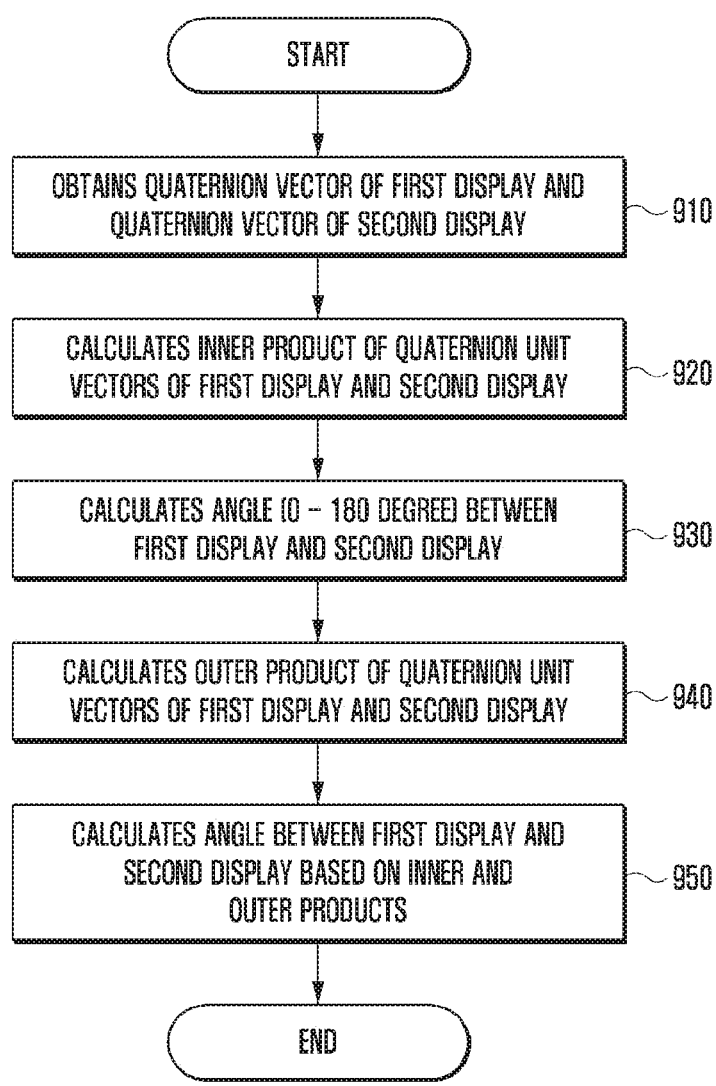
FIG. 9 is a flowchart of a method for measuring an angle between a first display and a second display by using a quaternion vector, according to an embodiment of the present disclosure.

The angle measuring module 610 can measure an angle between the first display 410 and the second display 420 by using a quaternion vector, a detailed description of which is made with reference to FIG. 9.

Figure 10:
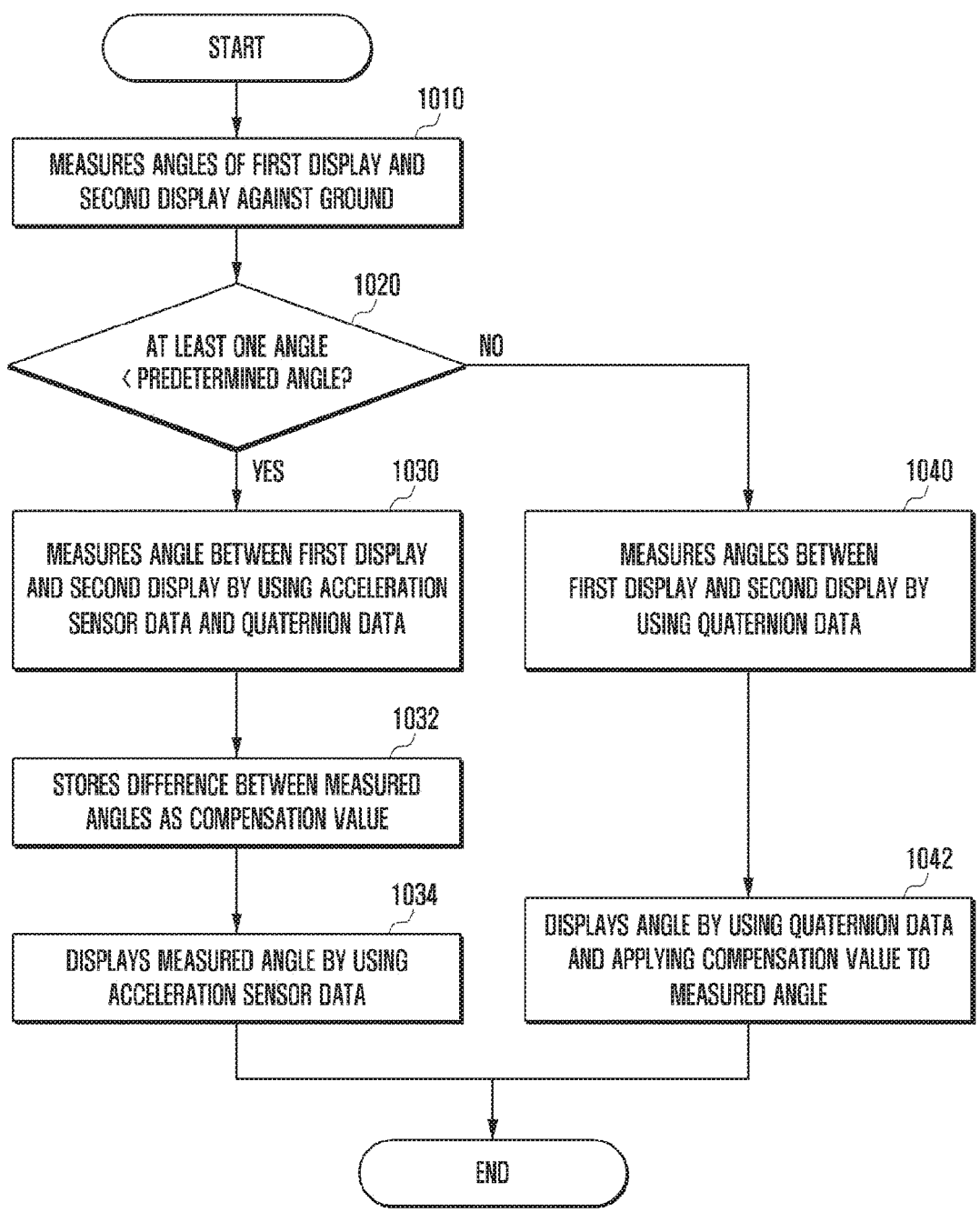
FIG. 10 a flowchart of a method for measuring an angle between a first display and a second display by using a compensation value, according to an embodiment of the present disclosure.

The angle measuring module 610 can measure an angle between the first display 410 and the second display 420 by applying a compensation value to the angle measured by using a quaternion vector, a detailed description of which is made with reference to FIGS. 9 and 10.

The angle applying module 620 can provide various functions for a user by using the angle between the first display 410 and the second display 420 measured by the angle measuring module 610, a detailed description of which is made with reference to FIGS. 11A to 22C.

Figure 7:
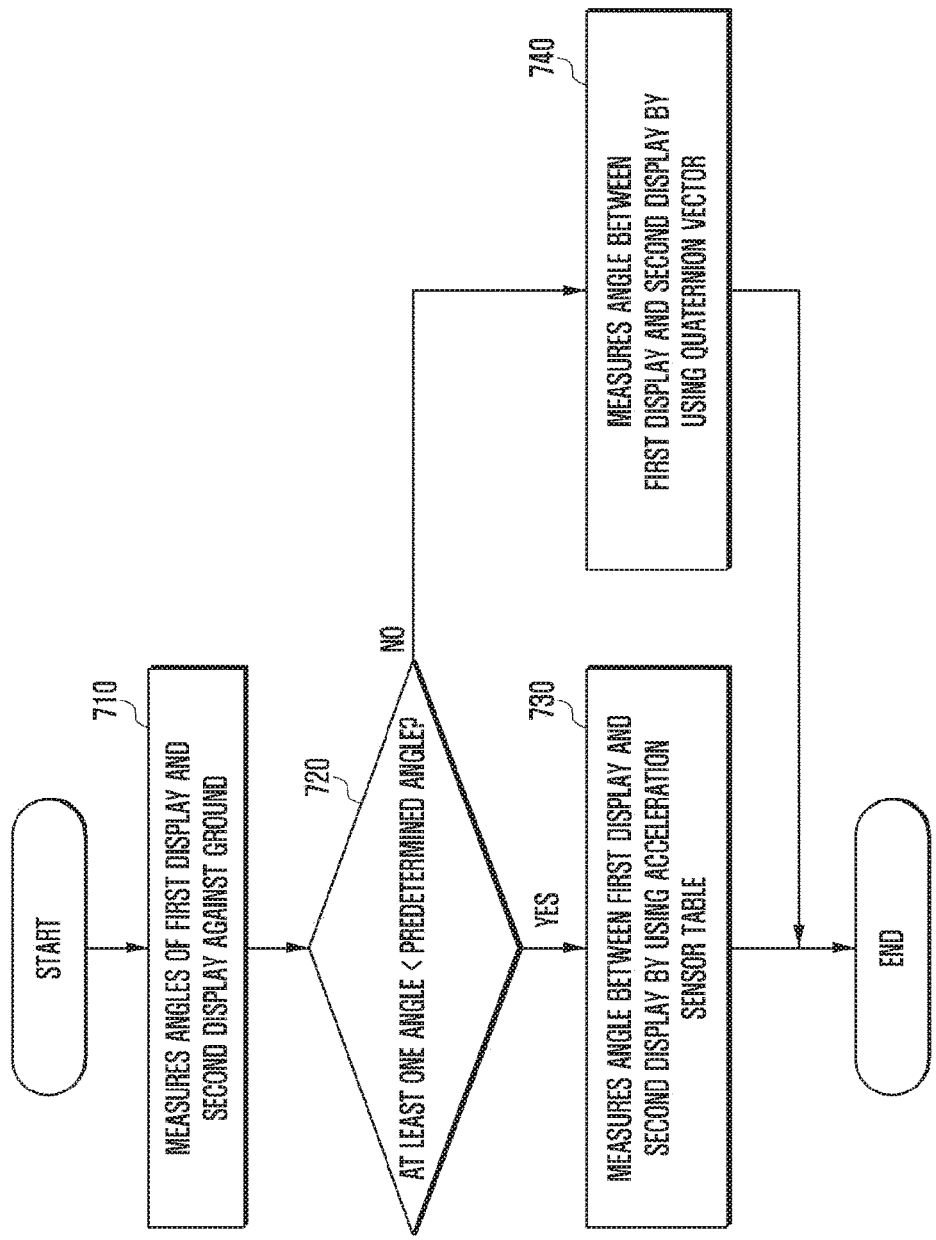
FIG. 7 is a flowchart of a method for measuring an angle between a first display and a second display, according to an embodiment of the present disclosure.

FIG. 7 is a flowchart of a method for measuring an angle between a first display and a second display, according to an embodiment of the present disclosure.

The electronic device 400 measures angles of the first display 410 and the second display 420 against a ground or a reference point, at step 710, wherein the ground might be a flat surface comprising a horizontal plane that is a standard for measuring the angle of the first display or of the second display. Namely, an angle between the first display 410 and the ground and an angle between the second display 420 and the ground can be measured.

The electronic device 400 identifies whether at least one angle measured at step 710 is less than a predetermined angle at step 720. For example, it can be identified or determined whether at least one of the angle between first display 410 and the ground and the angle between the second display 420 and the ground is less than 10 degrees; the accuracy of the measured angles can be decreased if the angle between the display and the ground exceeds 10 degrees. Namely, if the angle exceeds 10 degrees, the deviation of gravity acceleration in the Z-axis is very small; however there is difficulties in measuring a change of the angle between the first display 410 and the second display 420 only with the acceleration sensor because dynamic ranges of the acceleration sensor in the X-axis and Y-axis directions are reduced. The predetermined angle can be set to a value other than 10 degrees, and can be set to any meaningful value for an accurate angle measurement.

If the identified angle is less than the predetermined angle, the electronic device 400 measures the angle between the first display 410 and the second display 420 by using an acceleration sensor at step 730, a detailed description of which is made with reference to FIG. 8.

If the at least one angle exceeds the predetermined angle, the electronic device 400 measures the angle between the first display 410 and the second display 420 by using a quaternion vector at step 740, a detailed description of which is made with reference to FIG. 9.

FIG. 8 is a flowchart of a method for measuring an angle between a first display and a second display by using acceleration sensor data, according to an embodiment of the present disclosure.

The electronic device 400 can measure an angle between the first display 410 and the second display 420 by using an acceleration sensor if at least one angle of the first display 410 and the second display 420 against the ground is less than a predetermined angle (for example, 10 degrees).

The electronic device 400 obtains sensor data from a first sensor 415 installed in the first display 410 and a second sensor 425 installed in the second display 420 at step 810. Here, the sensor data obtained from the first sensor 415 may be defined as first acceleration sensor data (x1, y1, and z1) and the sensor data obtained from the second sensor 425 may be defined as second acceleration sensor data (x2, y2, and z2).

The electronic device 400 calculates magnitude(s) m of acceleration sensor data at step 820. For example, the electronic device 400 can calculate magnitudes of the first acceleration data and the second acceleration sensor data by using Equation (1).

$$m = \sqrt{x^2 + y^2 + z^2} \tag{1}$$

The electronic device 400 obtains angles of the displays against the ground by using the acceleration sensor data of the acceleration sensors 415 and 425 and magnitudes of the acceleration sensor data at step 830. For example, the electronic device 400 can measure the angle between the first display 410 and the ground and the angle between the second display 420 and the ground by using the Equation (2), and can calculate an angle between the first display 410 and the second display 420.

$$\text{Angle} = (\sin^{-1} \text{X-axis ingredient/magnitude}) * 180/\pi \tag{2}$$

FIG. 9 is a flowchart of a method for measuring an angle between a first display and a second display by using a quaternion vector, according to an embodiment of the present disclosure.

If angles of the first display 410 and the second display 420 against the ground exceed a predetermined value (for example, 10 degrees), the electronic device 400 can measure the angle between the first display 410 and the second display 420 by using a quaternion vector.

The quaternion vector can be defined as a vector extended from a 2-dimensional concept a+bi (sum of a real number and an imaginary number) to a 4-dimensional concept by adding j and k. Namely, the 2-dimensional expression of a complex number is extended to a 3-dimensional expression a+ib+jc by adding an imaginary number j, and the 3-dimensional expression is extended to the 4-dimensional expression a+ib+jc+kd by further adding an imaginary number k.

The electronic device 400 obtains quaternion vectors a1, b1, c1, and d1 of the first display 410 and quaternion vectors a2, b2, c2, and d2 of the second display 420 by using sensor data at step 910.

The electronic device 400 calculates an inner product of unit vectors of the first display 410 and the second display 420 by using the Equation (3) at step 920.

$$\vec{A} \cdot \vec{B} = |\vec{A}||\vec{B}|\cos\theta \tag{3}$$

The electronic device 400 obtains an angle between the first display and the second display by using the Equation (4) at step 930. However the angles obtained at steps 920 and 930 are in the range of 0 to 180 degrees because they have been calculated by using an inner product of angles. Therefore the angles can be compensated by using an outer product of quaternion vectors in order to obtain a more correct angle.

$$\cos^{-1}\left(\frac{\vec{A} \cdot \vec{B}}{|\vec{A}||\vec{B}|}\right) = \theta \tag{4}$$

The electronic device 400 calculates an outer product of quaternion vectors of the first display 410 and the second display 420 by using Equation (5) at step 940.

$$|\vec{A} \times \vec{B}| = |\vec{A}||\vec{B}|\sin\theta \tag{5}$$

The electronic device 400 obtains an angles of the first display 410 and the second display 420 by using Equation (6) at step 950. Namely, the electronic device 400 can measure an angle only in the range of 0 to 180 degrees, however the electronic device can measure angles of the first display 410 and the second display 420 more correctly in the range of 0 to 360 degrees by using the outer product of quaternion vectors.

$$\sin^{-1}\left(\frac{\vec{A} \times \vec{B}}{|\vec{A}||\vec{B}|}\right) = \theta \tag{6}$$

FIG. 10 a flowchart of a method for measuring an angle between a first display and a second display by using a compensation value, according to an embodiment of the present disclosure.

The electronic device 400 can obtain quaternion data through the sensors 415 and 425. However the quaternion data is calculated according to a theoretical formula and may have deviations from actual values. The deviations can be caused by errors such as inaccuracy of a sensor itself and noises due to external factors. Accordingly, the electronic device 400 can apply a compensation value in order to reduce errors possibly generated. Because an angle measured in a range less than a predetermined angle (for example, 10 degrees) by an acceleration sensor is relatively more correct than an angle measured by using quaternion data, a difference value between the two measured angles can be set as a compensation value.

The electronic device 400 measures angles of the first display 410 and the second display 420 against the ground at step 1010. Namely, an angle between the first display 410 and the ground and an angle between the second display 420 and the ground can be measured.

The electronic device 400 identifies whether at least one angle measured at step 1010 is less than a predetermined angle at step 1020. For example, it can be identified whether at least one of the angles between the first display 410 and the ground and the angle between the second display 420 and the ground is less than 10 degrees; the accuracy of angles measured by an acceleration sensor may decrease if an angle between a display and the ground exceeds 10 degrees. Namely, if the angle exceeds 10 degrees, the deviation of gravity acceleration in the Z-axis is very small; however, there are difficulties in measuring a change of the angle between the first display 410 and the second display 420 only with the acceleration sensor because dynamic ranges of the acceleration sensor in the X-axis and Y-axis directions are reduced. The predetermined angle can be set to a value other than 10 degrees, and can be set to any meaningful value for an accurate angle measurement.

If the at least one angle is less than a predetermined value, the electronic device 400 measures an angle between the first display 410 and the second display 420 by using an acceleration sensor at step 1030 (FIG. 8).

The electronic device 400 measures an angle between the first display 410 and the second display 420 by using a quaternion vector at step 1040 (FIG. 9).

The electronic device 400 stores the difference between the angle measured at step 1030 and the angle measured at step 1040 as a compensation value at step 1050. Subsequently, if both the angle between the first display 410 and the ground and the angle between the second display and the ground exceed a predetermined value, the electronic device 400 can obtain a final angle by applying the compensation value to the measured angle.

An angle applying module 620 of electronic device 400 can operate on the basis of an angle measured by the angle measuring module 610 of the electronic device 400.

Figure 11A:
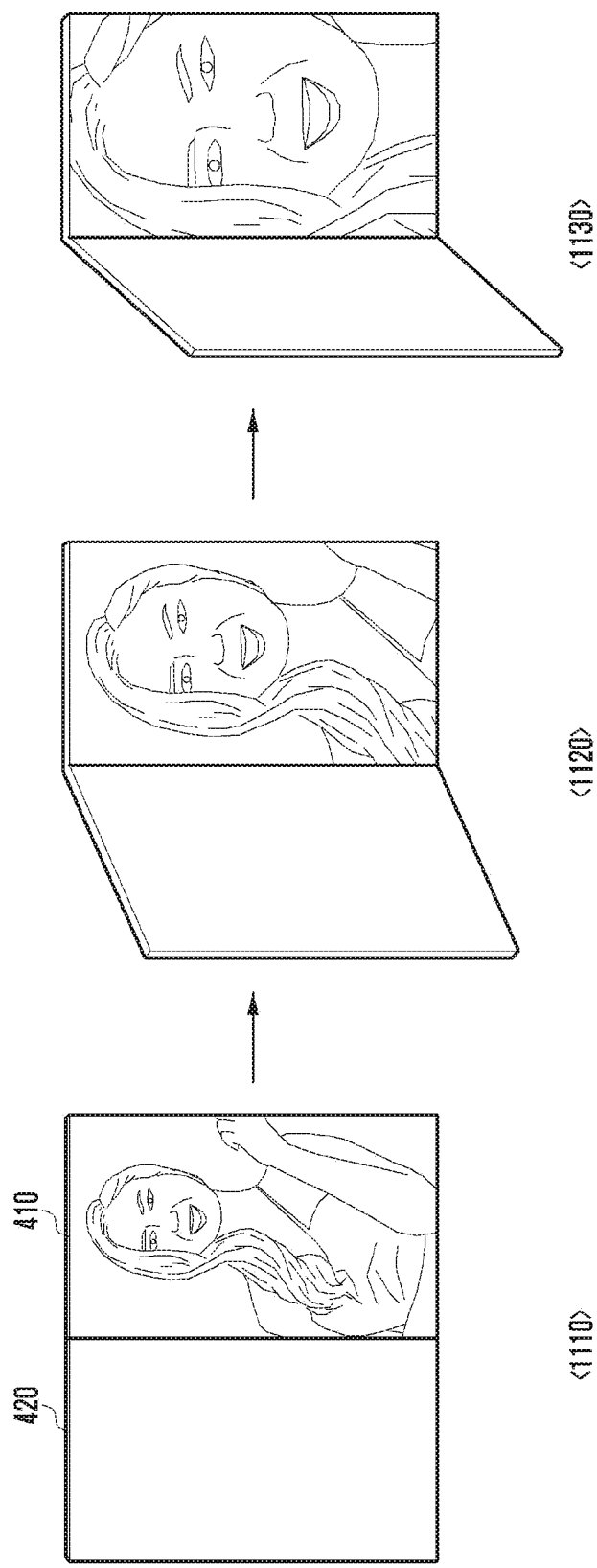
FIG. 11A is a diagram of a method for adjusting an image size by using an angle between displays, according to an embodiment of the present disclosure.

FIG. 11A is a diagram of a method for adjusting an image size by using an angle between displays, according to an embodiment of the present disclosure.

Figure 11B:
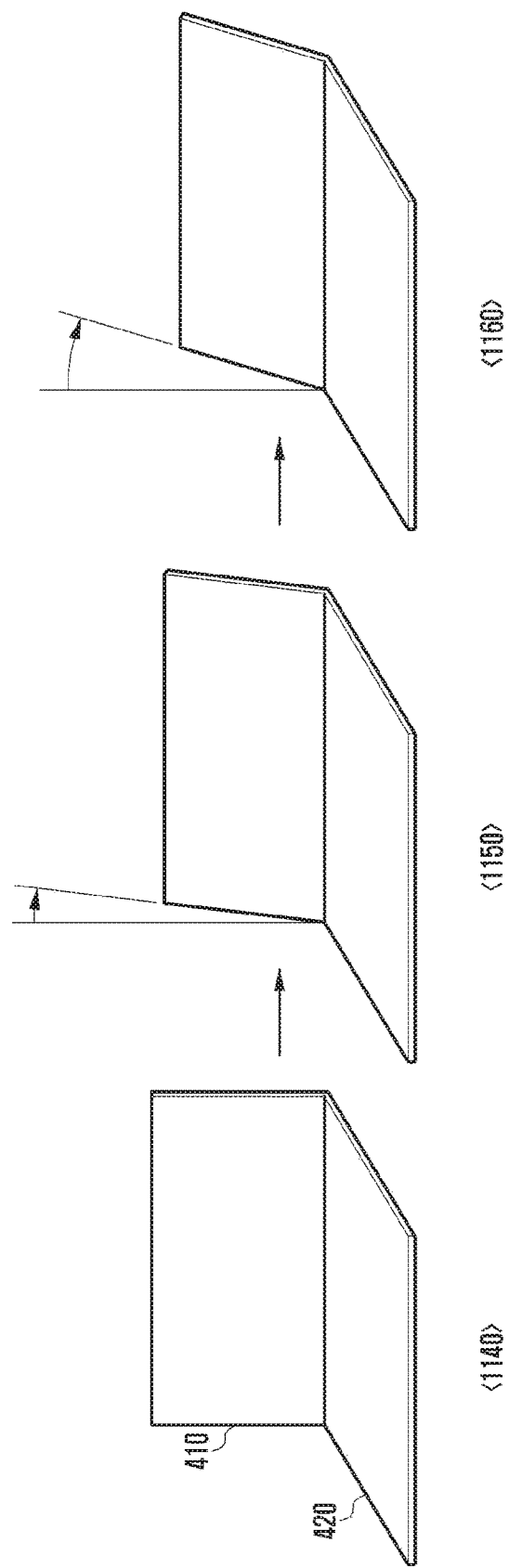
FIG. 11B is a diagram of a method for adjusting a video play speed by using an angle between displays, according to an embodiment of the present disclosure.

The electronic device 400 can adjust the size of a displayed image corresponding to the angle between the first display 410 and the second display 420. For example, an image having a specific size can be displayed as shown by reference number 1110 if the angle between the first display 410 and the second display is 180 degrees. If the angle between the first display 410 and the second display 420 is reduced to 160 degrees, the size of the image can be magnified by 2 times as shown by reference number 1120. If the angle between the first display 410 and the second display 420 is reduced to 140 degrees, the size of the image can be magnified by 4 times as shown by reference number 1130. Further, if the angle between the first display 410 and the second display 420 becomes greater than 180 degrees, the electronic device 400 switches to an image reducing function and can reduce the size of the image inversely to the increasing angle between the first display 410 and the second display 420. Adjusting the image size can be applied to an image view function (magnification or reduction) for a gallery and a camera function (zoom in or zoom out). FIG. 11B is a diagram of a method for adjusting a video play speed by using an angle between displays, according to an embodiment of the present disclosure.

The electronic device 400 can adjust a video play speed corresponding to the angle between the first display 410 and the second display 420. For example, if the angle between the first display 410 and the second display 420 is 90 degrees as shown by reference number 1140, a video can be played in a normal speed. If the angle between the first display 410 and the second display 420 is increased to 100 degrees as shown by reference number 1150, a video can be played in a double speed. If the angle between the first display 410 and the second display 420 is increased to 110 degrees as shown by reference number 1160, a video can be played in a quad speed. Further, if the angle between the first display 410 and the second display 420 becomes less than 90 degrees, the electronic device 400 can switch to a rewind function and rewind faster inversely to the decreasing angle.

Figure 12:
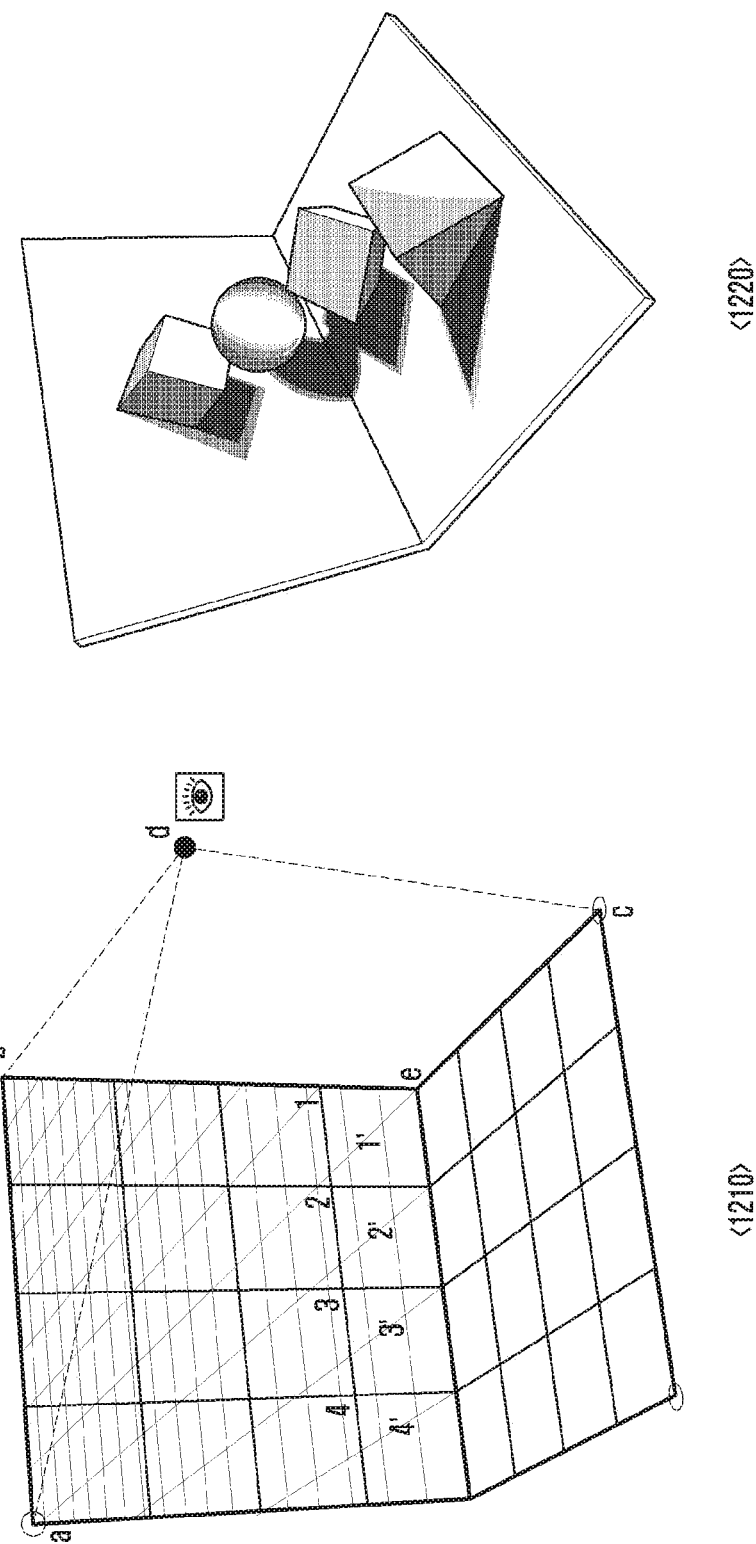
FIG. 12 is a diagram of a method for providing a 3D stereo effect by using an angle between displays, according to an embodiment of the present disclosure.

FIG. 12 is a diagram of a method for providing a 3D stereo effect by using an angle between displays, according to an embodiment of the present disclosure.

The electronic device 400 can adjust a location of a screen displayed in the first display 410 and the second display 420 by using the angle between the first display 410 and the second display 420. The electronic device 400 can identify a user's view point by using a camera module installed in the first display 410 or the second display 420 as shown by reference number 1210. The electronic device 400 can adjust the location of the screen displayed in the first display 410 and the second display 420 on the basis of the user's view point and provide a 3D stereo effect for the user as shown by reference number 1220. Namely, the electronic device 400 can provide an optical illusion effect for the user such that objects displayed in the first display 410 and the second display 420 are protruding in a space between the displays.

Figure 13:
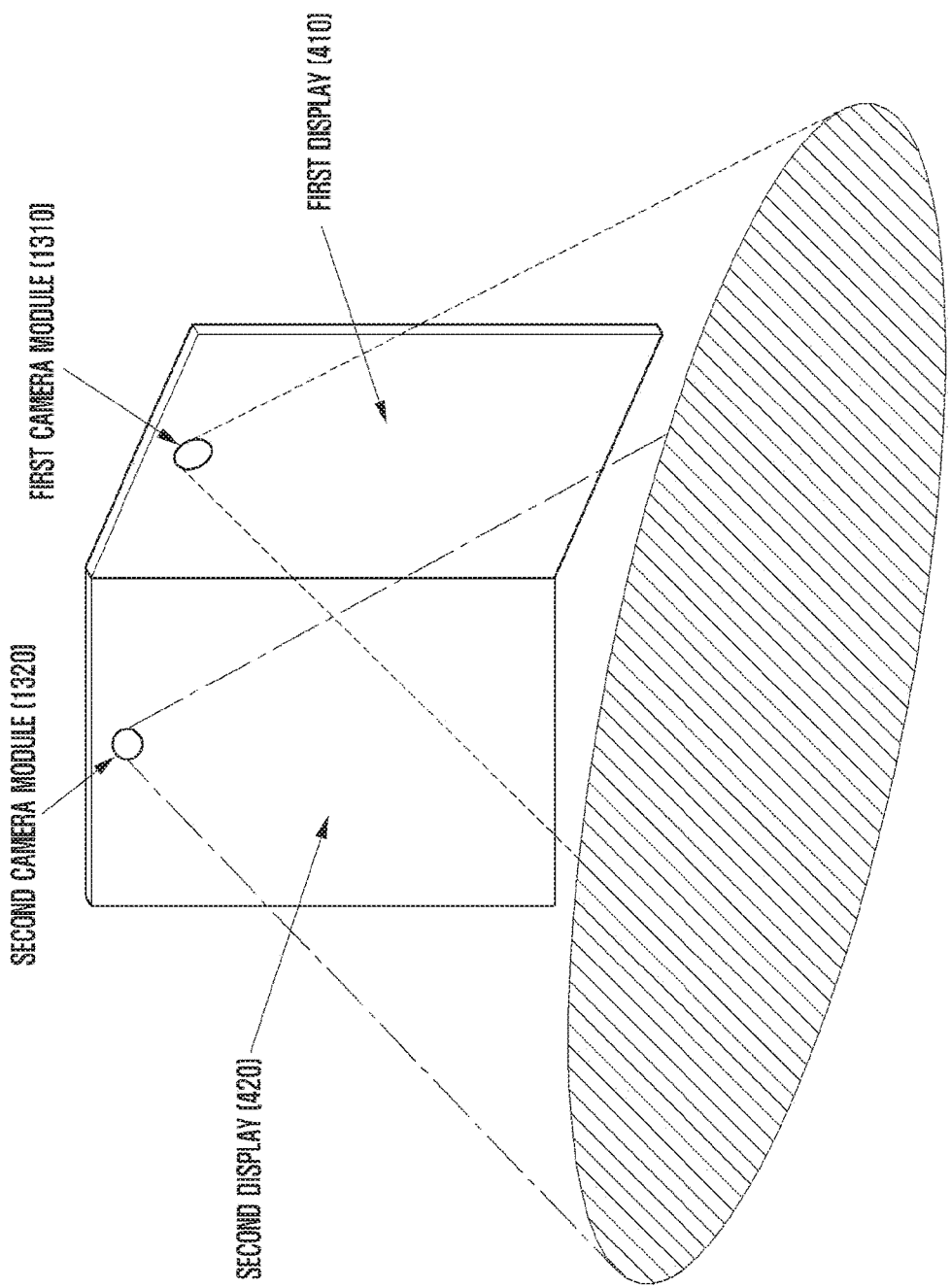
FIG. 13 is a diagram of a method for obtaining a wide angle image by using an angle between displays, according to an embodiment of the present disclosure.

FIG. 13 is a diagram of a method for obtaining a wide angle image by using an angle between displays, according to an embodiment of the present disclosure.

The electronic device 400 may include a first camera module 1310 installed in the first display 410 and a second camera module 1320 installed in the second display 420. The electronic device 400 can obtain a wide angle image by combining images obtained by the first camera module 1310 and the second camera module 1320. The electronic device 400 can identify an overlapping area of the images by using the angle between the first display 410 and the second display 420, and can obtain the wide angle image by processing the overlapping area.

Figure 14A:
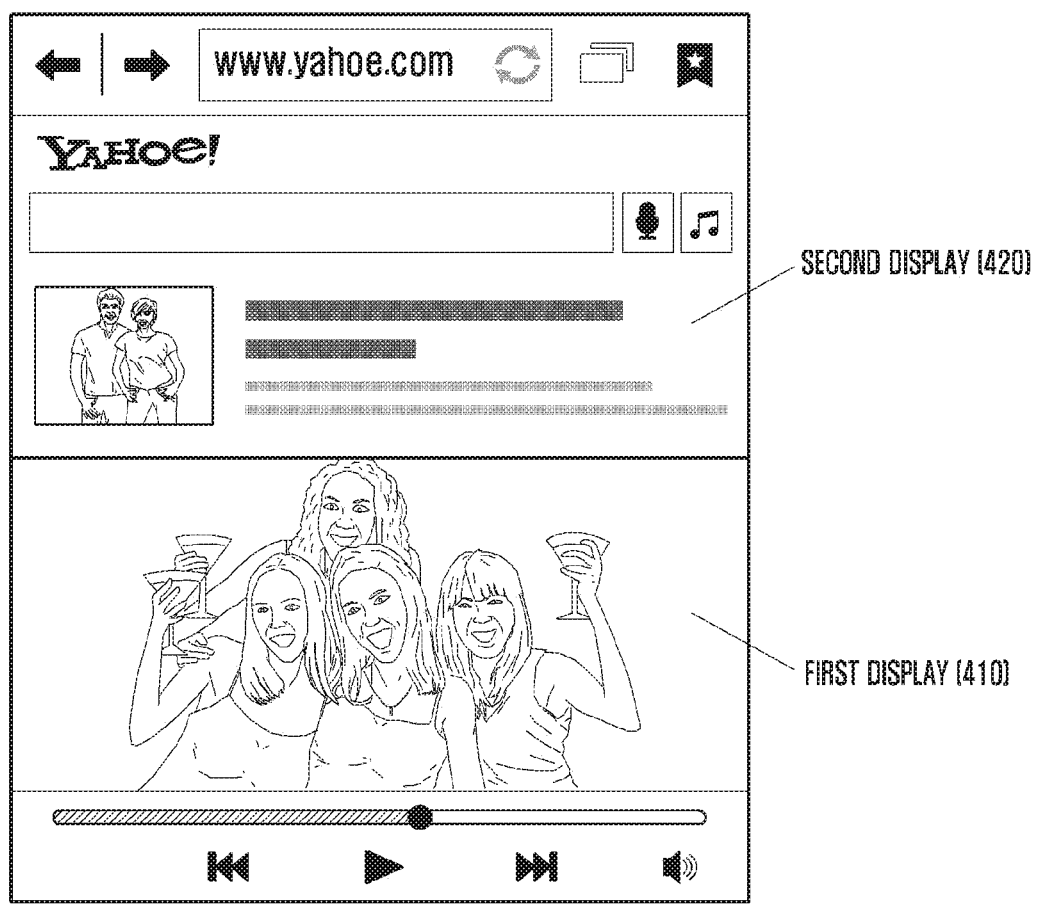
FIGS. 14A and 14B are screenshots of a method for changing a direction of displayed contents by using an angle between displays, according to an embodiment of the present disclosure.
Figure 14B:
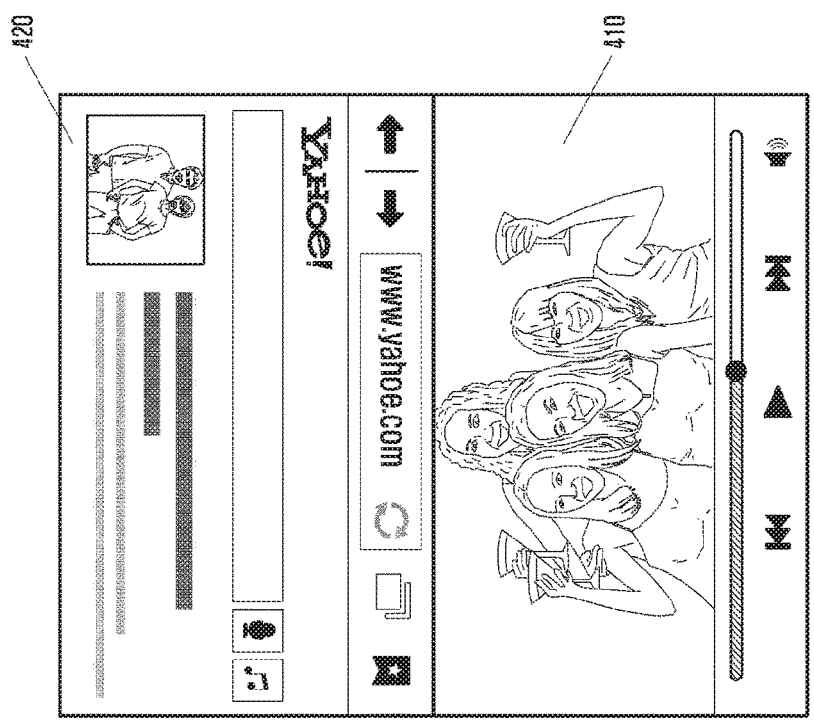
Figure 14B:
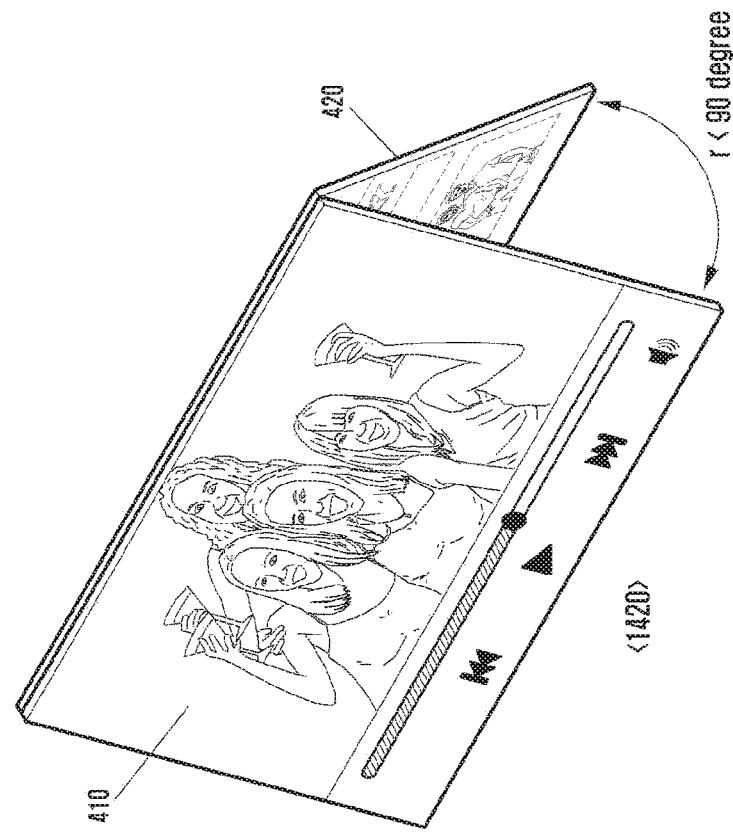

FIGS. 14A and 14B are screenshots of a method for changing a direction of displayed contents by using an angle between displays, according to an embodiment of the present disclosure.

With reference to FIG. 14A, if the first display 410 and the second display 420 are located at angles which a user can watch straight forward (e.g., the first display and the second display are not angled relative to each other), the electronic device 400 can display contents of the first display 410 and the second display 420 in the same direction.

If the angle between the first display 410 and the second display 420 is 180 degrees as shown by reference number 1410, both the first display 410 and the second display 420 are located in front of the user, and the electronic device 400 can display the contents of the first display 410 and the second display 420 in the same direction.

With reference to FIG. 14B, the electronic device 400 can change the content display direction of the first display 410 or the second display 420 if at least one angle of the first display 410 and the second display 420 cannot be seen in front of the user. For example, if the angle between the first display 410 and the second display 420 is less than 90 degrees or greater than 270 degrees, a content displayed in the first display 410 or the second display 420 cannot be seen to the user.

The electronic device 400 can change the right, left, upper, and lower sides of the displayed content if the angle between the first display 410 and the second display 420 is less than 90 degrees as shown by reference number 1420. In this instance, the electronic device 400 can display the contents of the second display so that another user or person located at the opposite side can see the content easily.

Figure 15:
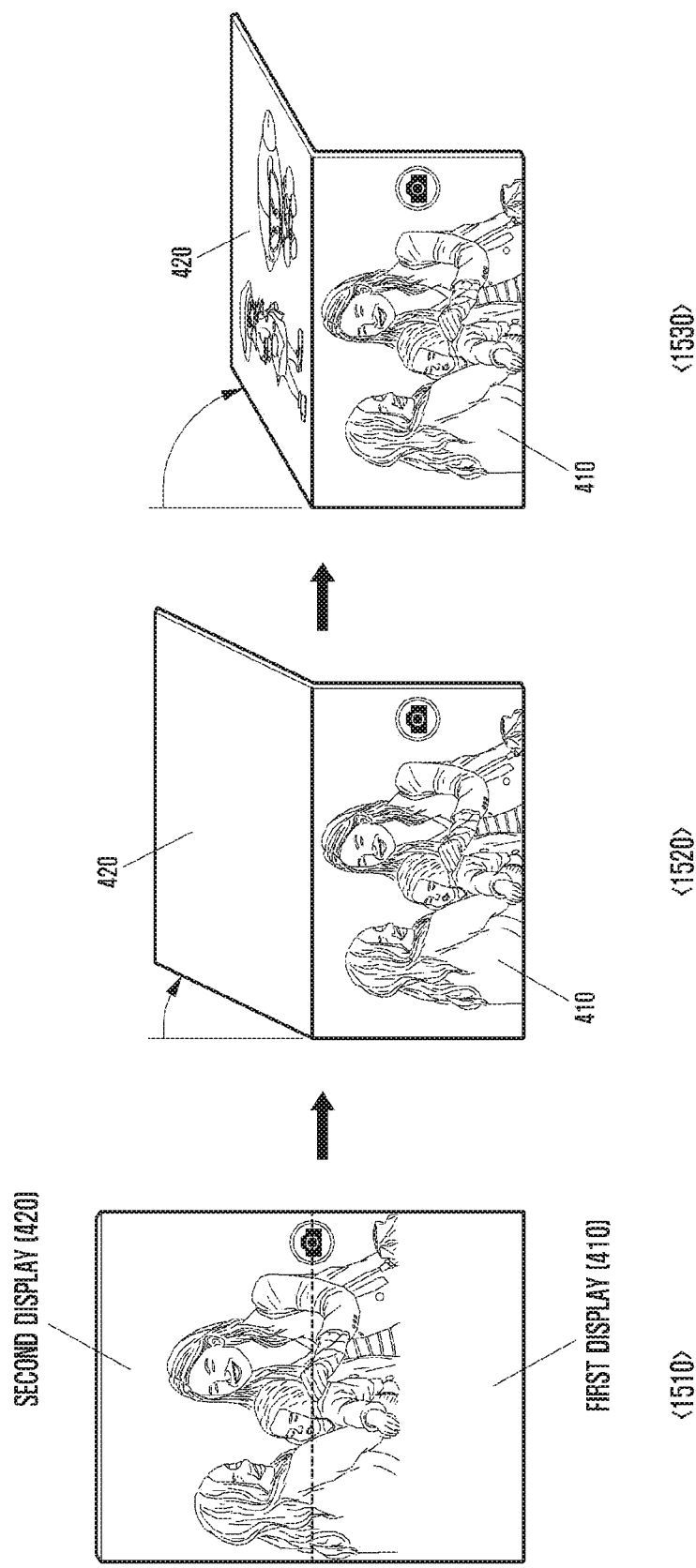
FIG. 15 is a screenshot of a method for obtaining an image by splitting displays corresponding to a folding angle between displays, according to an embodiment of the present disclosure.

FIG. 15 is a screenshot of a method for obtaining an image by splitting displays corresponding to a folding angle between displays, according to an embodiment of the present disclosure.

The electronic device 400 can display a preview image in both of the first display 410 and the second display 420 as shown by reference number 1510, if the first display 410 and the second display 420 are located in front of the user's sight, e.g., the first display 410 and the second display 420 are flush with each other.

The electronic device 400 can display a preview image only in the first display 410 as shown by reference number 1520, if the second display 420 swivels backward and the angle between the displays become greater than 180 degrees.

The electronic device 400 can display a predetermined content in the second display as shown by reference number 1530 if the second display 420 swivels backward and the angle between the displays becomes greater than 270 degrees. For example, if the angle between the displays becomes greater than 270 degrees, the electronic device 400 can display an image of which a subject should take a pose.

The electronic device 400 can obtain information related to the age and emotion of a subject by using a camera module, and display a content optimized for the age and emotion of the subject in the second display 420. For example, if the subject is a child, the electronic device 400 can display a content such as an animation in the second display 420 so that the child can concentrate on taking a photograph.

The electronic device 400 can drive the camera modules 1310 and 1320 differently according to the folding angle of the first display 410 or the second display 420. For example, electronic device 400 can obtain a wider angle image by using both of the first camera module 1310 and the second camera module 1320 as shown by reference number 1510. The electronic device 400 can obtain an image by using only the first camera module 1310 as shown by reference number 1520. If the image obtained by the first camera module 1310 is covered by the second display 420, the electronic device 400 can obtain an image by using the second camera module 1320 as shown by reference number 1530.

Figure 16B:
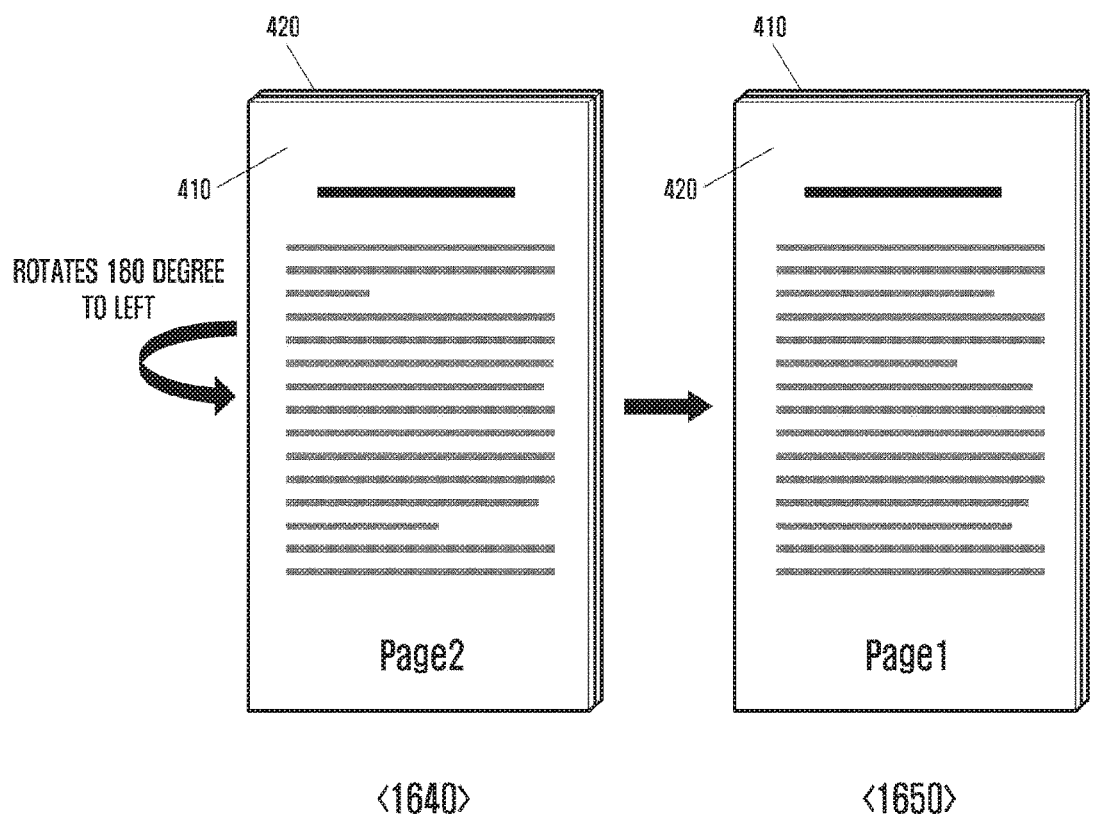
Figure 16C:
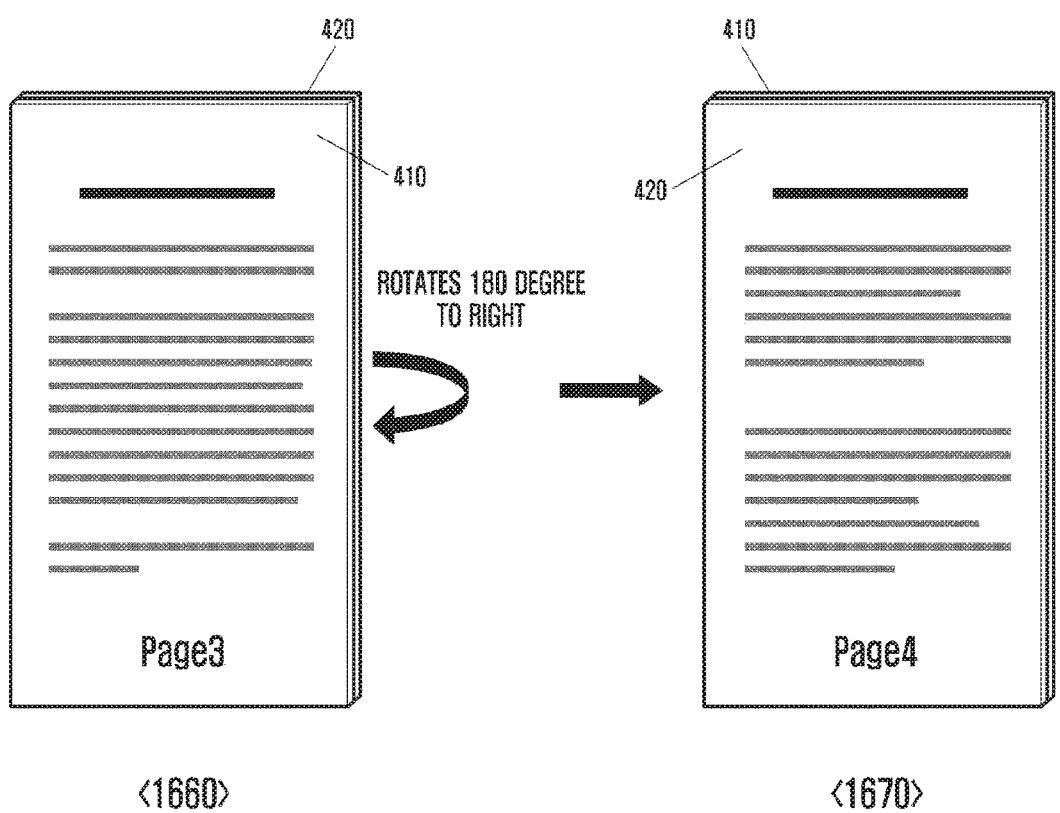

FIGS. 16A to 16C are screenshots of a method for displaying an electronic book by using an angle between displays, according to an embodiment of the present disclosure.

With reference to FIG. 16A, the electronic device 400 can detect a completely folded state of the first display 410 and the second display 420 (for example, 0 or 360 degrees).

With reference to FIG. 16B, the electronic device 400 can detect a rotation of the electronic device 400. For example, the electronic device 400 can detect 180 degrees rotation in the counter-clockwise direction (left to right), and can provide an effect of moving to the previous page. The electronic device 400 can display a second page in the first display 410 as shown by reference number 1640. The electronic device 400 can detect 180 degrees rotation in the counter-clock direction, and display a first page in the second display 420 located in front of the user as shown by reference number 1650.

With reference to FIG. 16C, the electronic device 400 can detect a rotation of the electronic device 400. For example, electronic device 400 can detect 180 degrees rotation of the electronic device 400 in the clockwise direction, and can provide an effect of moving to the next page for the user. The electronic device 400 can display a third page in the first display 410 as shown by reference number 1660. The electronic device 400 can further detect 180 degrees rotation of the electronic device 400 in the clockwise direction, and display a fourth page in the second display 420 located in front of the user as shown by reference number 1670. This is similar to a method of turning the pages and a more convenient operation environment can be provided for a user, because a movement to the previous page or the next page can be controlled according to the rotation direction of the electronic device 400.

Figure 17B:
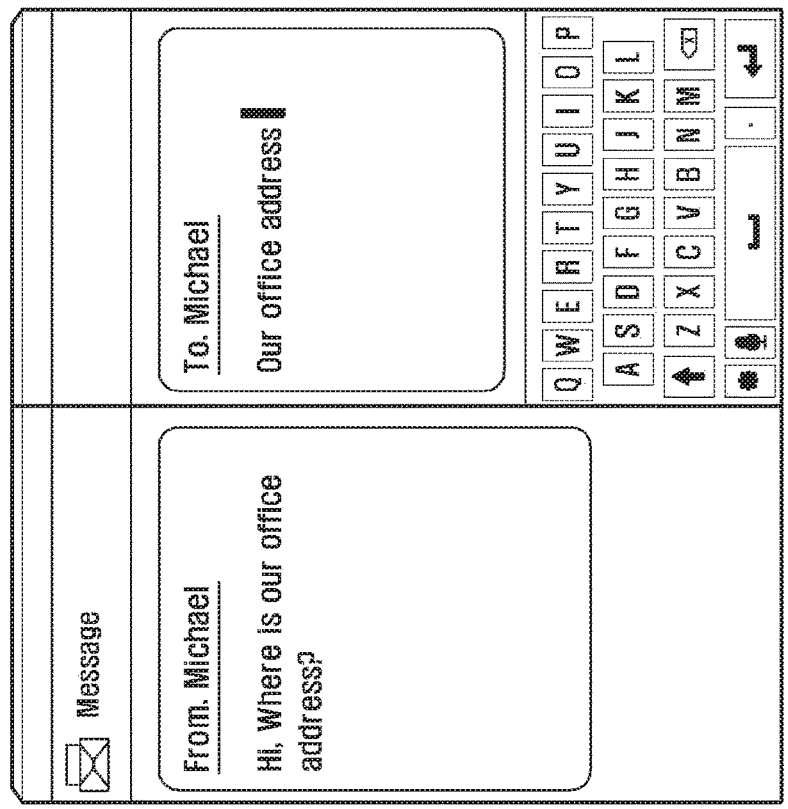
Figure 17B:
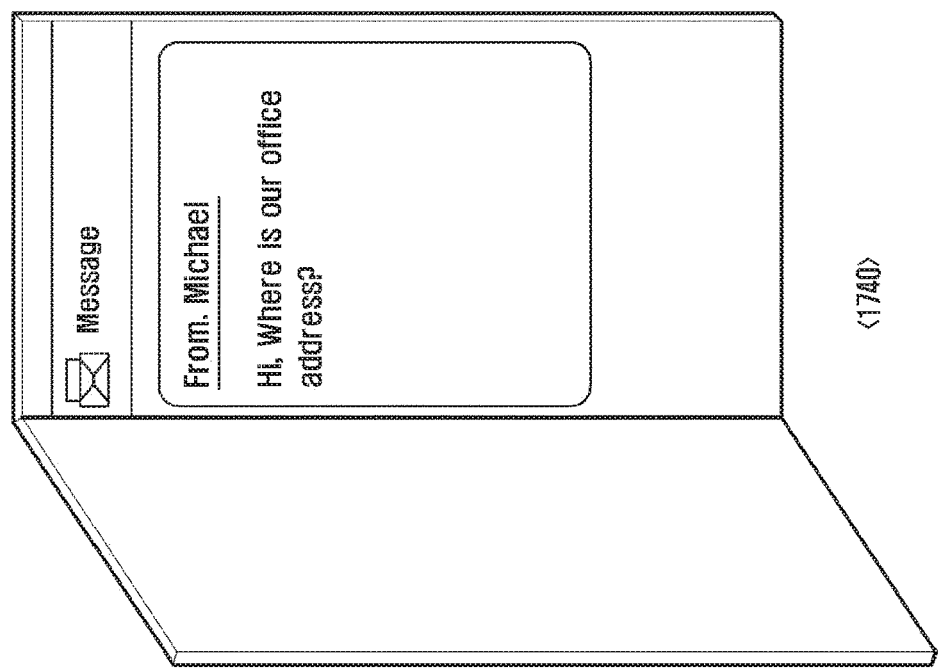

FIGS. 17A and 17B are screenshots a method for displaying different information in displays corresponding to an unfolding angle between the displays, according to an embodiment of the present disclosure.

The electronic device 400 can display different contents according to an unfolding angle of the first display 410 and the second display 420 from a folded state.

With reference to FIG. 17A, the electronic device 400 can receive a message in a state that the first display 410 and the second display 420 are folded. If the angle between the displays becomes a first angle (for example, 0-30 degrees), the electronic device 400 can display information related only to the number of messages and senders as shown by reference number 1720. If the angle between the displays become a second angle (for example, 30-60 degrees), the electronic device 400 can display a message content by gradually expanding the message content proportional to the increasing angle between the displays as shown by reference number 1730 (for example, by displaying one line at 30 degrees and two lines at 45 degrees).

With reference to FIG. 17B, if the angle between the displays reaches a third angle (for example, 90 degrees), the electronic device 400 can display the entire message as shown by reference number 1740. If the angle between the displays reaches a fourth angle (for example, 120 degrees), the electronic device 400 can display the entire message and a screen for preparing a reply message together as shown by reference number 1750.

Figure 18:
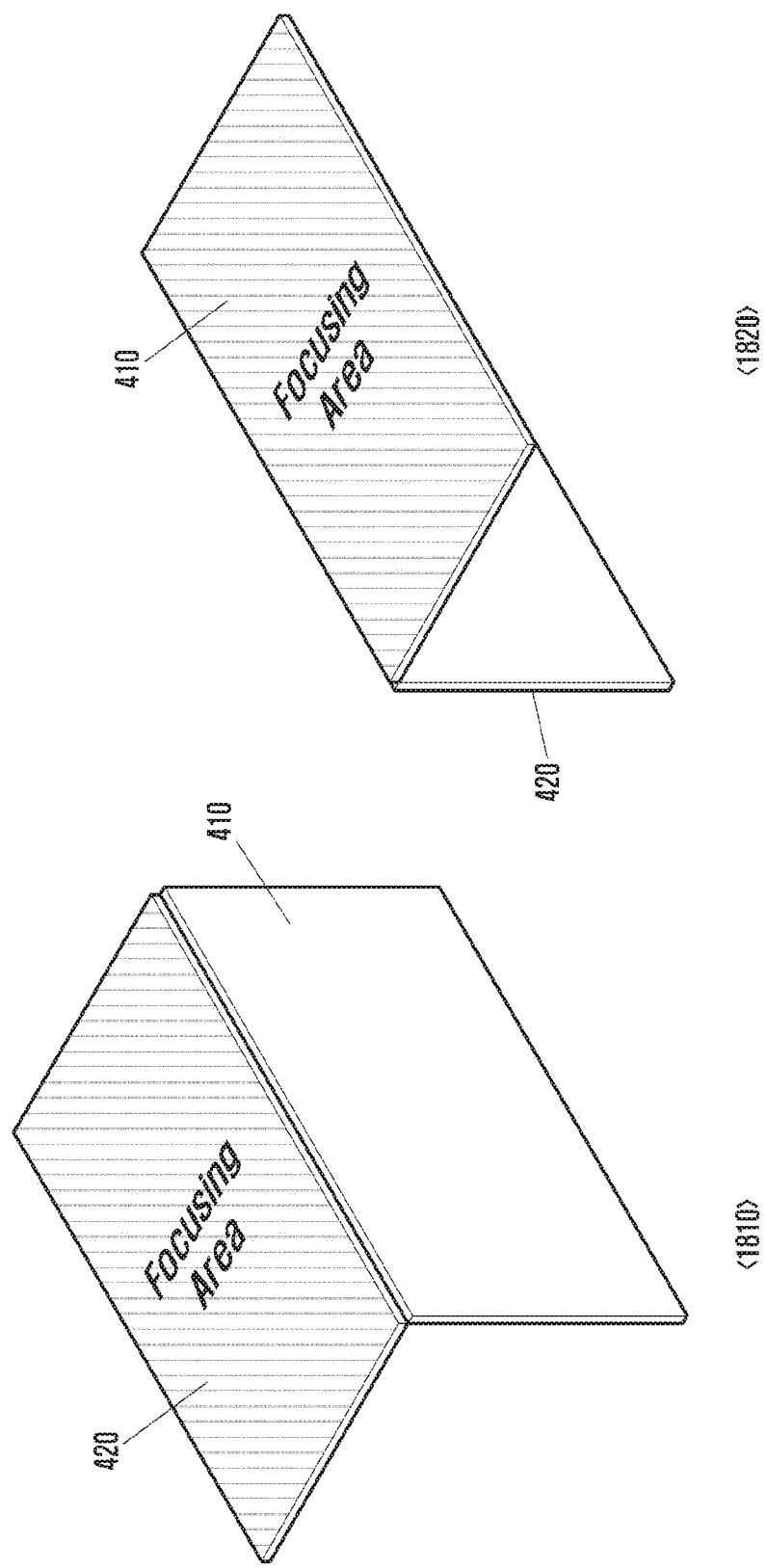
FIG. 18 is a diagram of a method for setting a focusing area by using an angle between displays, according to an embodiment of the present disclosure.

FIG. 18 is a diagram of a method for setting a focusing area by using an angle between displays, according to an embodiment of the present disclosure.

The electronic device 400 can set the first display 410 or the second display 420 as a focusing area. The focusing area can be defined as a display area in which a user concentrates or focuses their attention on. Namely, the focusing area may be defined as a display area facing a user's sight.

The electronic device 400 can determine a surface at which a user is looking by identifying a change of the angle between the first display 410 and the second display 420. For example, if the user is gripping the first display 410 with one hand, the second display 420 may sway more and the angle between the displays may change irregularly. Therefore the electronic device 400 can determine a display maintaining a horizontal state more stably as a focusing area. Further, the electronic device 400 can set the focusing area by receiving a user input. Additionally, the electronic device 400 can detect a user by using a camera module, proximity sensor, infrared sensor, and microphone, and set the focusing area on the basis of the detection.

The electronic device 400 can save power consumption by switching off a display other than the display set as a focusing area. Namely, because the user watches only the focusing area, the power consumption can be reduced by switching off screens other than the focusing area.

Figure 19:
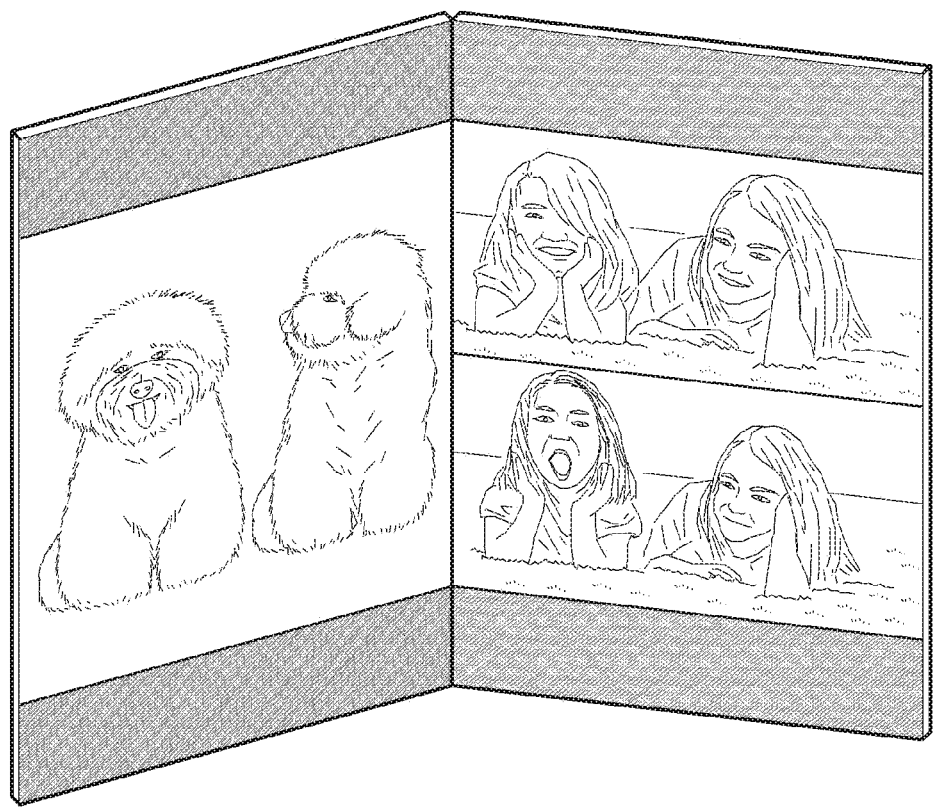
FIG. 19 is a screenshot of a method for executing a photo slide function by using an angle between displays, according to an embodiment of the present disclosure.

FIG. 19 is a screenshot of a method for executing a photo slide function by using an angle between displays, according to an embodiment of the present disclosure.

The electronic device 400 can perform a photo slide function if the electronic device 400 is erected and has no additional movement in a certain angle (for example, 90-120 degrees).

The electronic device 400 can perform the photo slide function by using photos stored in the electronic device 400 or received from a server. Here, the time, direction, and location of the photo slide function can be set or changed by the user.

Figure 20:
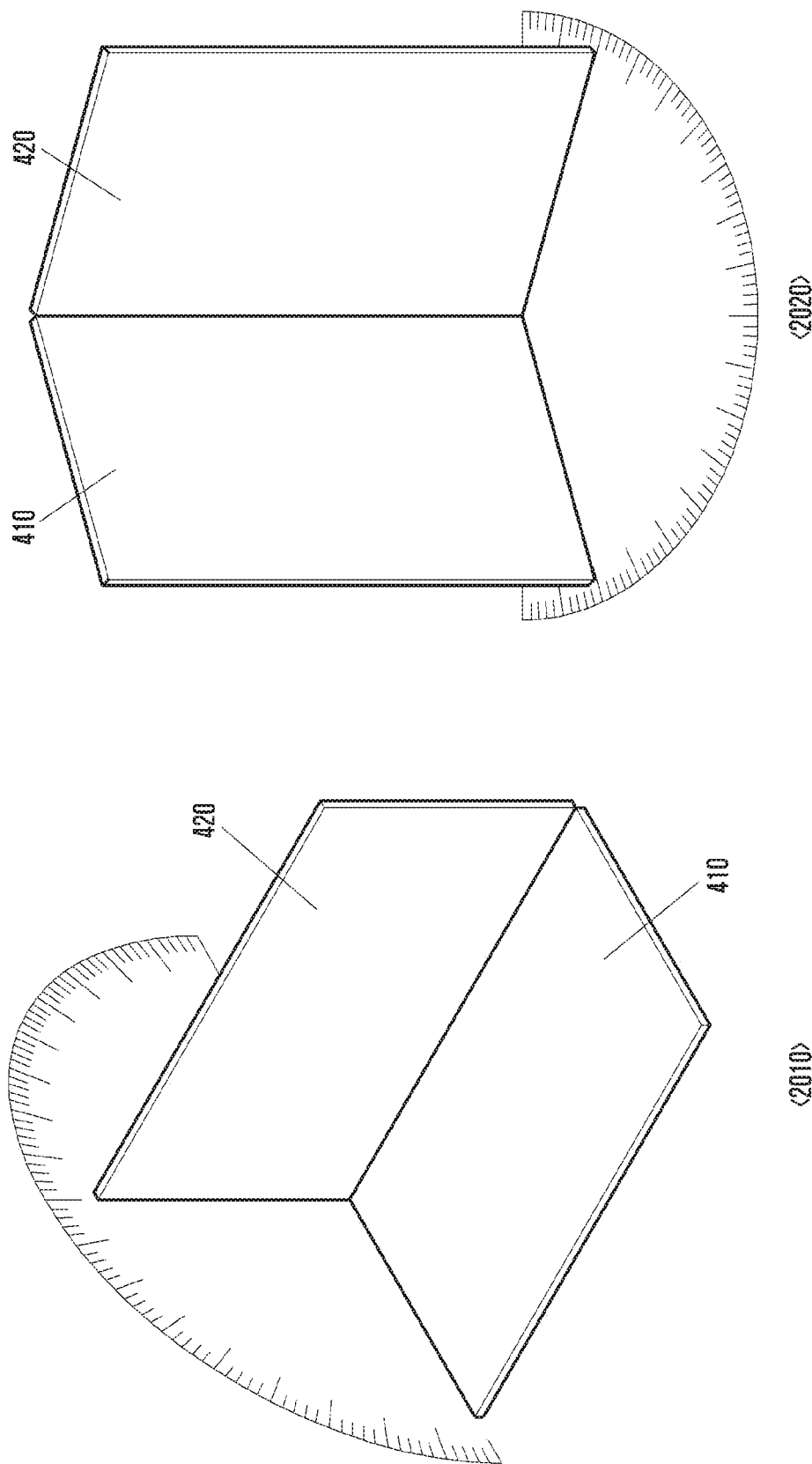
FIG. 20 is a diagram of a method for using an electronic device as a goniometer by using an angle between displays, according to an embodiment of the present disclosure.

FIG. 20 is a diagram of a method for using an electronic device as a goniometer by using an angle between displays, according to an embodiment of the present disclosure.

The electronic device 400 measures a folding angle between the first display 410 and the second display 420 adjusted by the user as shown by reference numbers 2010 and 2020. Namely, the electronic device 400 can measure and display an angle of an external object by using the folding angle of the first display 410 and the second display 420.

Figure 21A:
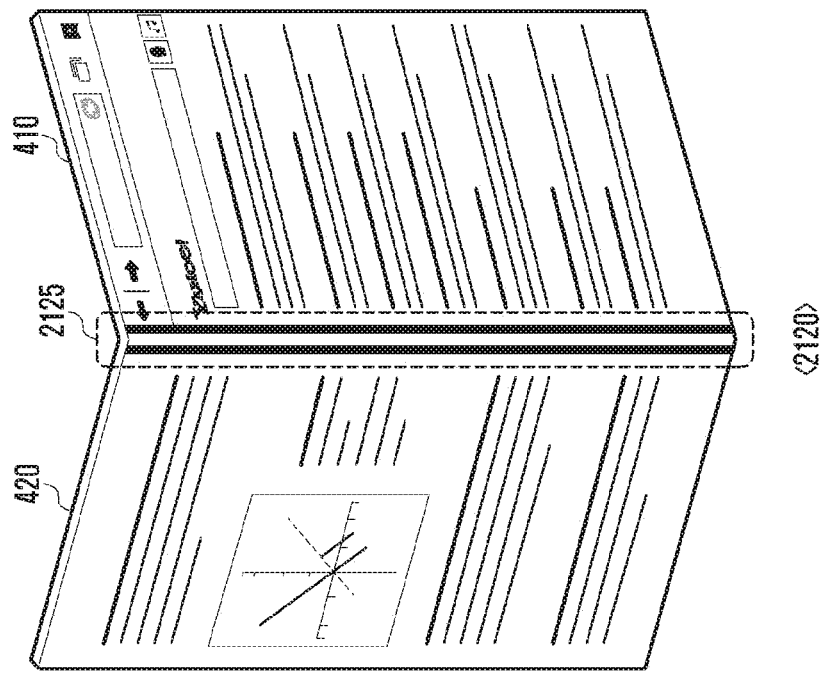
Figure 21A:
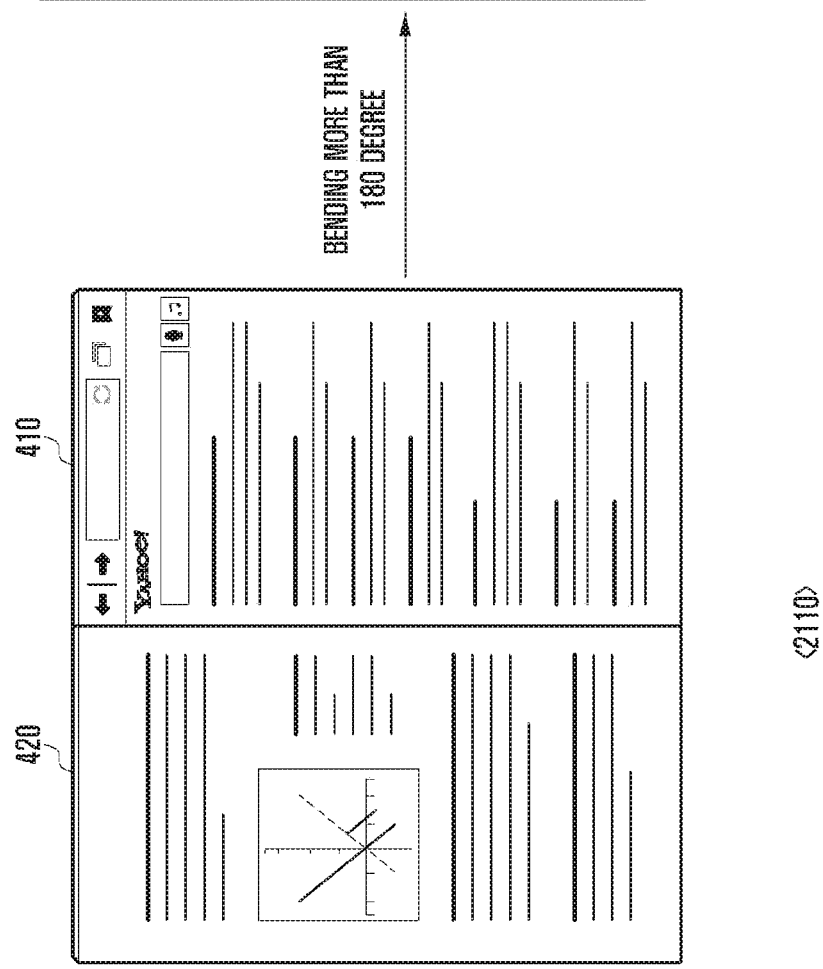

FIGS. 21A and 21B are screenshots of a method for providing an application control interface by using an angle between displays, according to an embodiment of the present disclosure.

The electronic device 400 can display or hide a control interface 2125 according to the angle between the first display 410 and the second display 420. For example, the electronic device 400 can display the control interface 2125 if the angle between the displays is greater than a predetermined angle (for example, 180 degrees) and hide the control interface 2125 if the angle between the displays is less than the predetermined angle as shown by reference numbers 2110 and 2120, respectively. Further, the electronic device 400 can display the control interface 2125 wider as the angle between the displays becomes greater, and can hide the control interface 2125 as the angle between the displays becomes smaller.

The electronic device 400 can display a control interface 2125 in an area of at least one of the first display 410 and the second display 420. For example, the electronic device 400 can display at least a part of the control interface 2125 in an adjacent area where the first display 410 and the second display 420 are connected each other. Further, a third display area can be displayed according to the structure of the electronic device 400.

The electronic device 400 can utilize the control interface 2125 as a task management area. For example, when the control interface 2125 operates as a task management area, the electronic device 400 can display an application list. Here, the displayed applications may include an application being executed, application being executed in a background, and application designated by a user. The electronic device 400 can display an application by combining at least one of an application name, window title, icon, and execution screen. Of course, any display method for identifying an application can be used besides the above method. The electronic device 400 can display at least one application by grouping the applications.

The electronic device 400 can control an application by using the control interface 2125. For example, the electronic device 400 can perform functions such as displaying an application selected by a user in the front window, omitting from display items, terminating execution, designating to operate in a background, stopping execution, and displaying execution information.

A display for displaying the front window may be a focusing area, a display for displaying the control interface 2125, or a display for receiving a user's application selection input. Alternatively, the user can designate a display for displaying the front window by using a tap or a drag & drop.

The electronic device 400 can utilize the control interface 2125 as a system control area. For example, when the control interface 2125 operates as a system control area, the electronic device 400 can display system information and a system control menu including usage of system resources, current time, brightness adjustment, volume adjustment, network state, and current user profile. Of course, the electronic device 400 can perform the task management and the system control simultaneously by using the control interface 2125.

The electronic device 400 can output the control interface 2125 to the first display 410 if the angle between the displays becomes greater than 180 degrees as shown by reference number 2130. If the user selects a messenger icon from the control interface 2125, the electronic device 400 can display a messenger (or message recipient) in the front window of the first display 410 as shown by reference number 2140.

Figure 22A:
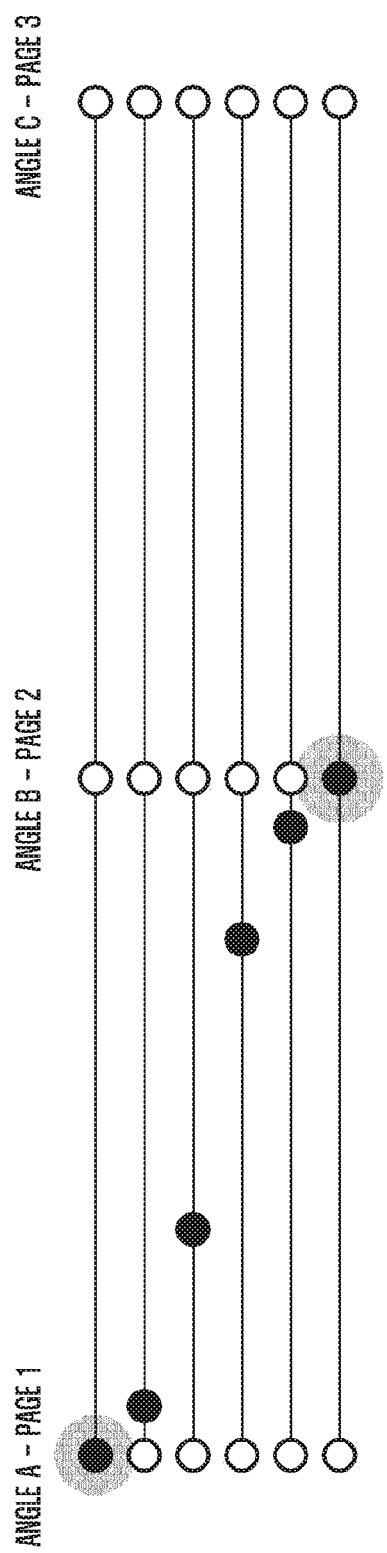
FIGS. 22A to 22C are diagrams of a method for displaying and managing angle information for executing a function by using an angle between displays, according to an embodiment of the present disclosure.
Figure 22B:
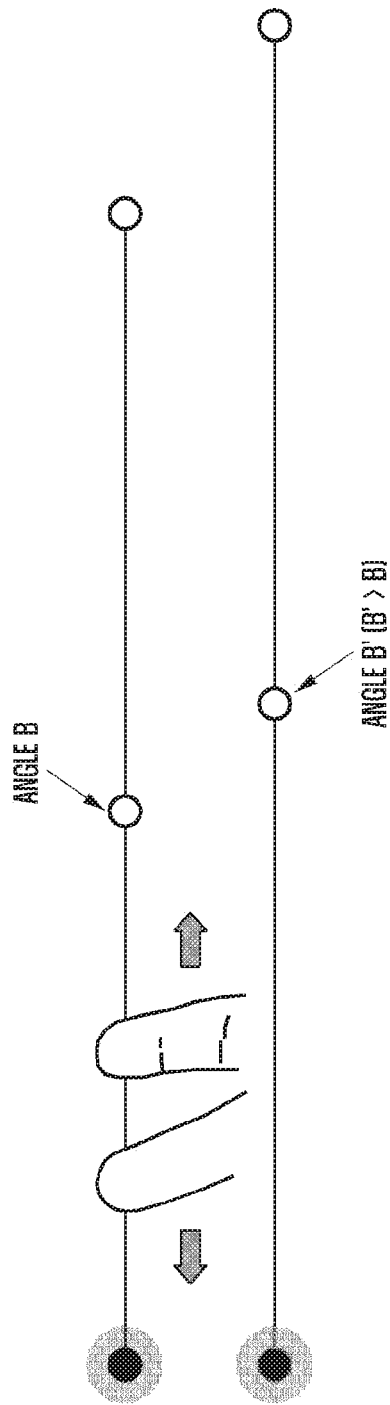
Figure 22C:
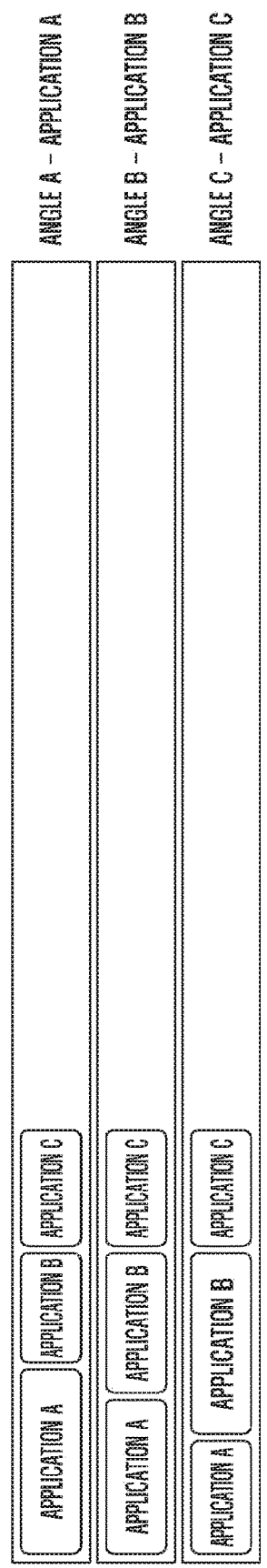

FIGS. 22A to 22C are diagrams of a method for displaying and managing angle information for executing a function by using an angle between the displays, according to an embodiment of the present disclosure.

The electronic device 400 can display angle information for performing a function corresponding to an angle between the displays and provide an interface for adjusting the angle in order to perform a function. For example, the electronic device 400 can display at least one of a function being executed, an angle of a specific function to be executed, and a current angle between the displays. The user can identify which application is being executed at a certain angle and identify a residual angle for performing a function desired by the user.

With reference to FIG. 22A, the electronic device 400 a can display an indication ● at the current angle between the displays according to the change of angle in a state that an indication ○ is displayed at a base angle for executing a function. In this instance, the user can intuitively identify how much angle should be changed to perform a designated function.

With reference to FIG. 22B, the electronic device 400 can provide an interface for adjusting a base angle to perform a function. For example, if the angle between the displays required for executing a specific function is 90 degrees, the user can change the angle through an angle adjustment interface so that the specific function can be executed at 100 degrees. Namely, the user can adjust the sensitivity to the angle for performing a function by directly inputting an angle value in the displayed interface.

With reference to FIG. 22C, when displaying applications to be executed at each angle, the electronic device 400 can display by reflecting or projecting the current angle. For example, the electronic device 400 can display indicators such as an application A to be executed at angle A, application B to be executed at angle B, and application C to be executed at angle C. The electronic device 400 can display an item related to the application A (for example, a button or an indicator) in the largest size while executing the application A at the angle A, and display a button indicating the application A gradually in a smaller size and a button indicating application B gradually in a larger size if the user changes the angle to the angle B to execute the application B.

An electronic device according to various embodiments of the present invention may include: a foldable housing configured to include a first housing part including a first surface and a second surface facing opposite to the first surface, a second housing part including a first surface facing to the first surface of the first housing part when folded in a first direction and a second surface facing to the second surface of the first housing part when folded in a second direction, and a connector for connecting the first housing part and the second housing part; a first display exposed through the first surface of the first hosing part; a second display exposed through the second surface of the second housing part; a first sensor disposed in the first housing part; a second sensor disposed in the second housing part; a processor electrically connected to the first display, second display, first sensor, and second sensor; and a memory electrically connected to the processor, wherein the memory is configured to store instructions so that the processor identifies an angle between the first housing part and the second housing part by using the first sensor and the second sensor and executes at least one action based on the identified angle.

The electronic device may further include a third sensor disposed in the first housing part and a fourth sensor disposed in the second housing part, and the instructions enable the processor to identify the angle by using the third sensor and the fourth sensor.

The first sensor and the second sensor may be acceleration sensors, and the third sensor and the fourth sensor may be gyro sensors.

The first sensor and the third sensor may be configured to be integrated and disposed in the first housing part, and the second sensor and the fourth sensor may be configured to be integrated and disposed in the second housing part.

The first sensor may be disposed in the peripheral area of the first display and the second sensor may be disposed in the peripheral area of the second display.

The instructions enable the processor to measure a first angle between the first housing part and the ground, to measure a second angle between the second housing part and the ground, and to identify whether at least one of the first angle and the second angle is less than a predetermined angle, when the processor identifies an angle between the first housing part and the second housing part.

The instructions enable the processor to identify an angle between the first housing part and the second housing part by using data obtained from the acceleration sensors if the at least one of the first angle and the second angle is equal to or less than the predetermined angle, when the processor identifies the angle between the first housing part and the second housing part.

The instructions enable the processor to identify an angle between the first housing part and the second housing part by using a quaternion vector if both the first angle and second angle exceeds the predetermined angle, when the processor identify the between the first housing part and the second housing part.

The instructions enable the processor to obtain a first quaternion vector of the first housing part by using data obtained from the first sensor and the third sensor, and to obtain a second quaternion vector of the second housing part by using data obtained from the second sensor and the fourth sensor, when the processor identify the between the first housing part and the second housing part.

The instructions enable the processor to calculate inner and outer product values of the first quaternion vector and the second quaternion vector and to identify an angle between the first housing part and the second housing part based on the inner and outer product values, when the processor identify the between the first housing part and the second housing part.

The at least one action may include an operation of expanding or reducing at least one content displayed in the first display or the second display according to an increase of the angle.

The at least one action may include an operation of increasing a play speed of at least one content displayed in the first display or the second display according to an increase of the angle.

The at least one action may include an operation of overturning at least one content displayed in the first display or the second display if the angle exceeds the predetermined angle.

The at least one action may include an operation of outputting a first screen in the first display and the second display if the angle is less than the predetermined angle, and outputting the first screen in the first screen and a second screen in the second display if the angle exceeds the predetermined angle.

The first screen may include a first object at least partially, and the second screen may include a second object different from the first screen at least partially.

The at least one action may include an operation of outputting a control interface in at least one of the first display and the second display if the angle exceeds the predetermined angle.

The control interface operates in a task management area and displays at least one application.

The at least one application may include at least one of an application being displayed in the first display or the second display, application being executed in a background, and predetermined application.

An electronic device according to various embodiments of the present invention may include a foldable housing configured to include a first housing part including a first surface and a second surface facing opposite to the first surface, a second housing part including a first surface facing to the first surface of the first housing part when folded in a first direction and a second surface facing to the second surface of the first housing part when folded in a second direction, and a connector for connecting the first housing part and the second housing part; a first display exposed through the first surface of the first hosing part; a second display exposed through the second surface of the second housing part; a sensor disposed in the first housing part; a processor electrically connected to the first display, second display, and sensor; and a memory electrically connected to the processor. The memory is configured to store instructions so that the processor identifies an angle between the first housing part and the second housing part by using the sensors and executes at least one action based on the identified angle.

The electronic device further may include a magnetic material disposed in the second housing part, and the instructions enable the processor to identify the angle based on measurement performed by using a magnetic flux generated by the magnetic material.

The electronic devices described herein can measure an angle between displays by installing at least one sensor in a housing including a plurality of screens. Further various functions can be provided for a user by utilizing the measured angle.

The modules (or programming modules) described herein may include one or more components, remove part of them described above, or include new components. The operations performed by the modules, the programming modules, or the other components, may be executed in serial, parallel, repetitive or heuristic fashion. Part of the operations can be executed in any other order, skipped, or executed with additional operations.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
   a foldable housing including a first housing part that includes a first surface and a second surface facing opposite to the first surface,
   a second housing part including a first surface that faces the first surface of the first housing part when the housing is folded in a first direction and a second surface that faces the second surface of the first housing part when the housing is folded in a second direction, and
   a connector configured to connect the first housing part to the second housing part;
   a first display being a part of the first housing part;
   a second display being a part of the second housing part;
   a first sensor disposed in the first housing part;
   a second sensor disposed in the second housing part; and
   a processor that is configured to identify an angle between the first housing part and the second housing part using the first sensor and the second sensor and execute at least one action of the electronic device based on the identified angle.

2. The electronic device of claim 1, wherein the electronic device further comprises a third sensor that is disposed in the first housing part and a fourth sensor that is disposed in the second housing part, and the processor is further configured to identify the angle y using the third sensor and the fourth sensor.

3. The electronic device of claim 2, wherein the first sensor and the second sensor are acceleration sensors and the third sensor and the fourth sensor are gyro sensors.

4. The electronic device of claim 3, wherein the first sensor and the third sensor are disposed in the first housing part and the second sensor and the fourth sensor are disposed in the second housing part.

5. The electronic device of claim 3, wherein the processor is further configured to measure a first angle between the first housing part and a ground, to measure a second angle between the second housing part and the ground, and to identify whether at least one of the first angle and the second angle is less than a predetermined angle when the processor identifies an angle between the first housing part and the second housing part.

6. The electronic device of claim 5, wherein the processor is further configured to identify an angle between the first housing part and the second housing part using data obtained from the acceleration sensors if at least one of the first angle and the second angle is equal to or less than the predetermined angle, when the processor identifies the angle between the first housing part and the second housing part.

7. The electronic device of claim 5, wherein the processor is further configured to identify an angle between the first housing part and the second housing part using a quaternion vector if both the first angle and second angle exceeds the predetermined angle when the processor identifies the angle between the first housing part and the second housing part.

8. The electronic device of claim 7, wherein the processor is further configured to obtain a first quaternion vector of the first housing part using data obtained from the first sensor and the third sensor and to obtain a second quaternion vector of the second housing part using data obtained from the second sensor and the fourth sensor when the processor identifies the angle between the first housing part and the second housing part.

9. The electronic device of claim 8, wherein the processor is further configured to calculate inner and outer product values of the first quaternion vector and the second quaternion vector and to identify an angle between the first housing part and the second housing part based on the calculated inner and outer product values when the processor identifies the angle between the first housing part and the second housing part.

10. The electronic device of claim 1, wherein the first sensor is disposed in a peripheral area of the first display and the second sensor is disposed in a peripheral area of the second display.

11. The electronic device of claim 1, wherein the at least one action of the electronic device comprises one of expanding and reducing at least one content displayed in one of the first display and the second display according to an increase of the identified angle.

12. The electronic device of claim 1, wherein the at least one action of the electronic device comprises increasing a play speed of at least one content displayed in one of the first display and the second display according to an increase of the identified angle.

13. The electronic device of claim 1, wherein the at least one action of the electronic device comprises overturning at least one content displayed in one of the first display and the second display if the identified angle exceeds a predetermined angle.

14. The electronic device of claim 1, wherein the at least one action of the electronic device comprises outputting a first screen in the first display and the second display if the identified angle is less than a predetermined angle and outputting the first screen in the first screen and a second screen in the second display if the identified angle exceeds the predetermined angle.

15. The electronic device of claim 14, wherein the first screen comprises a first object and the second screen comprises a second object that is different from the first object of the first screen.

16. The electronic device of claim 1, wherein the at least one action of the electronic device comprises outputting a control interface in at least one of the first display and the second display if the identified angle exceeds a predetermined angle.

17. The electronic device of claim 16, wherein the control interface operates in a task management area and displays at least one application.

18. The electronic device of claim 17, wherein the at least one application comprises at least one of an application being displayed in the first display and the second display, an application being executed in a background, and a predetermined application.

19. An electronic device comprising:
- a foldable housing including a first housing part that includes a first surface and a second surface facing opposite to the first surface, a second housing part that includes a first surface that faces the first surface of the first housing part when the housing is folded in a first direction and a second surface that faces the second surface of the first housing part when the housing is folded in a second direction, and a connector configured to connect the first housing part to the second housing part;
- a first display being a part of the first hosing part;
- a second display being a part of the second housing part;
- a sensor disposed in the first housing part; and
- a processor that is configured to identify an angle between the first housing part and the second housing part using the sensor and execute at least one action of the electronic device based on the identified angle.

20. The electronic device of claim 19, wherein the electronic device further comprises a magnetic material that is disposed in the second housing part, and the processor is further configured to identify the angle based on measurement that is obtained using a magnetic flux generated by the magnetic material.

* * * * *

UNITED STATES PATENT AND TRADEMARK OFFICE
CERTIFICATE OF CORRECTION

PATENT NO. : 10,073,668 B2
APPLICATION NO. : 15/262917
DATED : September 11, 2018
INVENTOR(S) : Woosung Chun et al.

It is certified that error appears in the above-identified patent and that said Letters Patent is hereby corrected as shown below:

In the Claims

In Column 25, Claim 19, Line 17:
"a first dispay being a part of the first hosing part;"
Should be:
-- a first display being a part of the first housing part; --

Signed and Sealed this
Twenty-second Day of January, 2019

Andrei Iancu
*Director of the United States Patent and Trademark Office*